US008891457B2

(12) United States Patent
Zhang et al.

(10) Patent No.: US 8,891,457 B2
(45) Date of Patent: Nov. 18, 2014

(54) RESOURCE ASSIGNMENT SYSTEMS AND METHODS

(75) Inventors: Hang Zhang, Nepean (CA);
Mohammadhadi Baligh, Ottawa (CA);
Mo-Han Fong, L'Orignal (CA);
Dongsheng Yu, Ottawa (CA); Sophie Vrzic, Nepean (CA); Jun Li,
Richardson, TX (US); Wen Tong,
Ottawa (CA); Curt Dodd, Ottawa (CA)

(73) Assignee: Apple Inc., Cupertino, CA (US)

( * ) Notice: Subject to any disclaimer, the term of this patent is extended or adjusted under 35 U.S.C. 154(b) by 1565 days.

(21) Appl. No.: 12/086,254

(22) PCT Filed: Dec. 8, 2006

(86) PCT No.: PCT/CA2006/002007
§ 371 (c)(1),
(2), (4) Date: Jun. 9, 2008

(87) PCT Pub. No.: WO2007/065272
PCT Pub. Date: Jun. 14, 2007

(65) Prior Publication Data
US 2009/0285163 A1    Nov. 19, 2009

Related U.S. Application Data

(60) Provisional application No. 60/748,555, filed on Dec. 8, 2005, provisional application No. 60/792,486, filed on Apr. 17, 2006, provisional application No. 60/822,679, filed on Aug. 17, 2006.

(51) Int. Cl.
| | | |
|---|---|---|
| H04W 4/00 | (2009.01) | |
| H04L 12/66 | (2006.01) | |
| H04L 1/18 | (2006.01) | |
| H04L 5/00 | (2006.01) | |
| H04L 1/00 | (2006.01) | |
| H04L 1/06 | (2006.01) | |
| H04W 72/04 | (2009.01) | |
| H04W 72/12 | (2009.01) | |
| H04W 28/04 | (2009.01) | |

(52) U.S. Cl.
CPC ......... H04W 72/1263 (2013.01); H04L 1/1896 (2013.01); H04L 1/1812 (2013.01);
(Continued)

(58) Field of Classification Search
USPC .................................................. 370/329, 352
See application file for complete search history.

(56) References Cited

U.S. PATENT DOCUMENTS

| 5,978,368 A | 11/1999 | Hjelm et al. | |
|---|---|---|---|
| 8,095,141 B2 * | 1/2012 | Teague .......................... | 370/329 |

(Continued)

FOREIGN PATENT DOCUMENTS

WO    WO 2004/095867 A1    11/2004

*Primary Examiner* — Noel Beharry
*Assistant Examiner* — Farhad Ali
(74) *Attorney, Agent, or Firm* — Meyertons, Hood, Kivlin, Kowert & Goetzel, P.C.

(57) ABSTRACT

In a wireless communication system, a base station assigns resources to mobile stations using indices. Each index is associated with an assignment schedule for assigning resources. Once the base station determines an assignment schedule to assign particular resources, it encodes the schedule into an index and transmits it. A mobile station receives the index and decodes it to recover the assignment schedule. Both the base station and the mobile station may use look-up tables and/or algorithms for storing or generating indices associated with assignment schedules. To assign resources so as to indicate transmission characteristics over the resources, the base station transmits assignment blocks. Each assignment block indicates original transmission, retransmission, persistent assignment, non-persistent assignment, HARQ signaling, RAS-HARQ signaling, DRCH assignment, and/or LRCH assignment.

34 Claims, 37 Drawing Sheets

(52) U.S. Cl.

CPC ............. *H04L 1/1825* (2013.01); *H04L 1/0016* (2013.01); *H04L 1/0045* (2013.01); *H04L 1/0656* (2013.01); *H04L 5/0092* (2013.01); *H04L 1/1887* (2013.01); *H04W 72/04* (2013.01); *H04W 72/1278* (2013.01); *H04L 1/0041* (2013.01); *H04W 28/04* (2013.01)

USPC .......................................... 370/329; 370/352

(56) References Cited

U.S. PATENT DOCUMENTS

| | | |
|---|---|---|
| 2005/0243940 A1 | 11/2005 | Huh et al. |
| 2005/0288030 A1 | 12/2005 | Choi et al. |
| 2006/0256887 A1* | 11/2006 | Kwon et al. .................. 375/260 |
| 2007/0053320 A1* | 3/2007 | Rinne et al. .................. 370/329 |
| 2008/0267168 A1* | 10/2008 | Cai et al. ....................... 370/352 |

* cited by examiner

| Assignment Schedules | | |
| --- | --- | --- |
| M = 1 | M = 2 | M = 3 |
| 16 | 1, 15 | 1,1,14 |
|  | 2,14 | 1,2,13 |
|  | 3,13 | 1,3,12 |
|  | 4,12 | 1,4,11 |
|  | 5,11 | 1,5,10 |
|  | 6,10 | 1,6,9 |
|  | 7,9 | 1,7,8 |
|  | 8,8 | 2,2,12 |
|  |  | 2,3,11 |
|  |  | 2,4,10 |
|  |  | 2,5,9 |
|  |  | 2,6,8 |
|  |  | 2,7,7 |
|  |  | 3,3,10 |
|  |  | 3,4,9 |
|  |  | 3,5,8 |
|  |  | 3,6,7 |
|  |  | 4,4,8 |
|  |  | 4,5,7 |
|  |  | 4,6,6 |
|  |  | 5,5,6 |

FIG. 3A

| Assignment Schedules and Assignment Schedule Indices (universal assignment indexing) | | | | | |
|---|---|---|---|---|---|
| Index | M = 1 | Index | M = 2 | Index | M = 3 |
| *0* | 16 | *1* | 1, 15 | *9* | 1,1,14 |
| | | *2* | 2,14 | *10* | 1,2,13 |
| | | *3* | 3,13 | *11* | 1,3,12 |
| | | *4* | 4,12 | *12* | 1,4,11 |
| | | *5* | 5,11 | *13* | 1,5,10 |
| | | *6* | 6,10 | *14* | 1,6,9 |
| | | *7* | 7,9 | *15* | 1,7,8 |
| | | *8* | 8,8 | *16* | 2,2,12 |
| | | | | *17* | 2,3,11 |
| | | | | *18* | 2,4,10 |
| | | | | *19* | 2,5,9 |
| | | | | *20* | 2,6,8 |
| | | | | *21* | 2,7,7 |
| | | | | *22* | 3,3,10 |
| | | | | *23* | 3,4,9 |
| | | | | *24* | 3,5,8 |
| | | | | *25* | 3,6,7 |
| | | | | *26* | 4,4,8 |
| | | | | *27* | 4,5,7 |
| | | | | *28* | 4,6,6 |
| | | | | *29* | 5,5,6 |

FIG. 3B

| \multicolumn{6}{c}{Assignment Schedules and Assignment Indices (Independent assignment indexing)} |

| Index | M = 1 | Index | M = 2 | Index | M = 3 |
|---|---|---|---|---|---|
| *0* | 16 | *0* | 1, 15 | *0* | 1,1,14 |
|  |  | *1* | 2,14 | *1* | 1,2,13 |
|  |  | *2* | 3,13 | *2* | 1,3,12 |
|  |  | *3* | 4,12 | *3* | 1,4,11 |
|  |  | *4* | 5,11 | *4* | 1,5,10 |
|  |  | *5* | 6,10 | *5* | 1,6,9 |
|  |  | *6* | 7,9 | *6* | 1,7,8 |
|  |  | *7* | 8,8 | *7* | 2,2,12 |
|  |  |  |  | *8* | 2,3,11 |
|  |  |  |  | *9* | 2,4,10 |
|  |  |  |  | *10* | 2,5,9 |
|  |  |  |  | *11* | 2,6,8 |
|  |  |  |  | *12* | 2,7,7 |
|  |  |  |  | *13* | 3,3,10 |
|  |  |  |  | *14* | 3,4,9 |
|  |  |  |  | *15* | 3,5,8 |
|  |  |  |  | *16* | 3,6,7 |
|  |  |  |  | *17* | 4,4,8 |
|  |  |  |  | *18* | 4,5,7 |
|  |  |  |  | *19* | 4,6,6 |
|  |  |  |  | *20* | 5,5,6 |

FIG. 3C

FIG. 4A
FIG. 4B
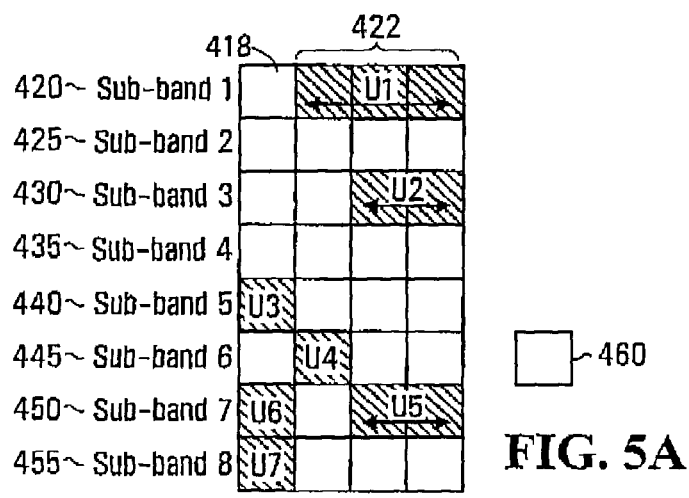
FIG. 5A
| | Combinations | Index | Index (binary) |
|---|---|---|---|
| M=1 | 4 | 0 | 000 |
| M=2 | 1,3 | 1 | 001 |
| | 2,2 | 2 | 010 |
| M=3 | 1,1,2 | 3 | 011 |
| M=4 | 1,1,1,1 | 4 | 100 |
FIG. 5B

Full set look-up table

| Combination assignment schedules and assignment schedule indices (Independent assignment indexing) | | | | | |
|---|---|---|---|---|---|
| Index | M = 1 | Index | M = 2 | Index | M = 3 |
| *0* | 16 | *0* | 1, 15 | *0* | 1,1,14 |
| | | *1* | 2,14 | *1* | 1,2,13 |
| | | *2* | 3,13 | *2* | 1,3,12 |
| | | *3* | 4,12 | *3* | 1,4,11 |
| | | *4* | 5,11 | *4* | 1,5,10 |
| | | *5* | 6,10 | *5* | 1,6,9 |
| | | *6* | 7,9 | *6* | 1,7,8 |
| | | *7* | 8,8 | *7* | 2,2,12 |
| | | | | *8* | 2,3,11 |
| | | | | *9* | 2,4,10 |
| | | | | *10* | 2,5,9 |
| | | | | *11* | 2,6,8 |
| | | | | *12* | 2,7,7 |
| | | | | *13* | 3,3,10 |
| | | | | *14* | 3,4,9 |
| | | | | *15* | 3,5,8 |
| | | | | *16* | 3,6,7 |
| | | | | *17* | 4,4,8 |
| | | | | *18* | 4,5,7 |
| | | | | *19* | 4,6,6 |
| | | | | *20* | 5,5,6 |

FIG. 7A

Sub-set look-up table

| Assignment schedule Index | Combination assignment schedules |
|---|---|
| 0 | 1,1,14 |
| 7 | 2,2,12 |
| 13 | 3,3,10 |
| 17 | 4,4,8 |
| 20 | 5,5,6 |

FIG. 7B

| Signaling method | Case 1<br>802.16e HARQ IE<br>(5 sub-burst in one burst) | Case 2<br>Tree bitmap | Case 3<br>Tree node ID | Case 4<br>Combination index |
|---|---|---|---|---|
| Scenario 1: 100 BAU, 80 users assigned (Number of bits) | 28x16 + 10x5x16 = 1248 | 199 | 8x80=640 | <25 |
| Scenario 2: 100 BAU, 40 users assigned (Number of bits) | 28x8 + 10x5x8 = 624 | 199 | 8x40=320 | <25 |
| Scenario 3: 100 BAU, 20 users assigned (Number of bits) | 28x4 + 10x5x4 = 312 | 199 | 8x20=160 | <25 |

FIG. 8A

| Number of BAUs | Number of sub-carriers required | Code rate | Modulation | Number of information bits |
|---|---|---|---|---|
| 1 | 1x48 | 1/2 | QPSK | 48 |
| 2 | 2x48 | 1/2 | QPSK | 96 |
| 3 | 3x48 | 1/3 | QPSK | 96 |
| 4 | 4x48 | 1/4 | QPSK | 96 |
| 5 | 5x48 | 1/5 | QPSK | 96 |
| 6 | 6x48 | 1/2 | QPSK | 288 |
| 7 | 7x48 | 1/3 | QPSK | 224 |
| 8 | 8x48 | 1/4 | QPSK | 192 |
| 9 | 9x48,kx9x48, k>=2 | 3/4 | QPSK | Kx648, k=1,2,... |
| 10 | 10x48,kx10x48, k>=2 | 1/5 | QPSK | kx192, k=1,2,... |
| 11 | 11x48,kx11x48, k>=2 | 3/4 | 16QAM | kx1584, k=1,2,... |
| 12 | 12x48, kx12x48, k>=2 | 1/2 | 16QAM | kx1152, k=1,2,... |
| 13 | 13x48, kx13x48, k>=2 | 3/4 | 16QAM | kx1872, k=1,2,... |
| 14 | 14x48,kx14x48, k>=2 | 1/2 | 16QAM | kx1344, k=1,2,... |
| 15 | 15x48, kx15x48, k>=2 | 2/3 | 64QAM | kx2880, k=1,2,... |
| 16 | 16x48,kx16x48, k>=2 | 3/4 | 64QAM | kx3456, k=1,2,... |

FIG. 9

```
function S = Splitter( minmax, maxmax, N, M, S1 )

N_entry = maxmax - minmax + 1;
max_vec = minmax:maxmax ;

S = [];

for ii = 1:N_entry max_j = max_vec(ii);

S_tmp = S1{ii,:};

N0 = N - max_j;   % next level M
  M0 = M - 1;       % next level N maxmax0 = min( N0 - M0 + 1, max_j );
  minmax0 = ceil( N0 / M0 );

N_entry0 = maxmax0 - minmax0 + 1;
  S_tmp = kron( S_tmp, ones( N_entry0, 1 ) );

S0 = [ S_tmp [minmax0:maxmax0]' ];

if( M0 > 1 )
    S0 = Splitter( minmax0, maxmax0, N0, M0, S0);
  end

S = [ S; S0 ];

end
```

FIG. 10A

```
function [ SG, N_G ] = IntegerSplit( N, M )

if( M == 1 )

SG(1).m = [N];
  N_G(1) = 1;

else maxmax = N - M + 1;
  minmax = ceil( N/M );

S = [minmax:maxmax]';

SG = Splitter( minmax, maxmax, N, M, S);

N_G = size( SG, 1);

end
```

FIG. 10B

Possible Combination Assignment Schedules

| | | Number of Mobile Stations (M) | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Number of BAUs (N) | 1 | 1 | 0 | 0 | 0 | 0 | 0 | 0 | 0 | 0 | 0 | 0 | 0 | 0 | 0 | 0 | 0 |
| | 2 | 1 | 1 | 0 | 0 | 0 | 0 | 0 | 0 | 0 | 0 | 0 | 0 | 0 | 0 | 0 | 0 |
| | 3 | 1 | 1 | 1 | 0 | 0 | 0 | 0 | 0 | 0 | 0 | 0 | 0 | 0 | 0 | 0 | 0 |
| | 4 | 1 | 2 | 1 | 1 | 0 | 0 | 0 | 0 | 0 | 0 | 0 | 0 | 0 | 0 | 0 | 0 |
| | 5 | 1 | 2 | 2 | 1 | 1 | 0 | 0 | 0 | 0 | 0 | 0 | 0 | 0 | 0 | 0 | 0 |
| | 6 | 1 | 3 | 3 | 2 | 1 | 1 | 0 | 0 | 0 | 0 | 0 | 0 | 0 | 0 | 0 | 0 |
| | 7 | 1 | 3 | 4 | 3 | 2 | 1 | 1 | 0 | 0 | 0 | 0 | 0 | 0 | 0 | 0 | 0 |
| | 8 | 1 | 4 | 5 | 5 | 3 | 2 | 1 | 1 | 0 | 0 | 0 | 0 | 0 | 0 | 0 | 0 |
| | 9 | 1 | 4 | 6 | 6 | 5 | 3 | 2 | 1 | 1 | 0 | 0 | 0 | 0 | 0 | 0 | 0 |
| | 10 | 1 | 5 | 7 | 9 | 7 | 5 | 3 | 2 | 1 | 1 | 0 | 0 | 0 | 0 | 0 | 0 |
| | 11 | 1 | 5 | 10 | 11 | 10 | 7 | 5 | 3 | 2 | 1 | 1 | 0 | 0 | 0 | 0 | 0 |
| | 12 | 1 | 6 | 12 | 15 | 13 | 11 | 7 | 5 | 3 | 2 | 1 | 1 | 0 | 0 | 0 | 0 |
| | 13 | 1 | 6 | 14 | 18 | 18 | 14 | 11 | 7 | 5 | 3 | 2 | 1 | 1 | 0 | 0 | 0 |
| | 14 | 1 | 7 | 16 | 23 | 23 | 20 | 15 | 11 | 7 | 5 | 3 | 2 | 1 | 1 | 0 | 0 |
| | 15 | 1 | 7 | 19 | 27 | 30 | 26 | 21 | 15 | 11 | 7 | 5 | 3 | 2 | 1 | 1 | 0 |
| | 16 | 1 | 8 | 21 | 34 | 37 | 35 | 28 | 22 | 15 | 11 | 7 | 5 | 3 | 2 | 1 | 1 |

FIG. 11

```
N=16; %% N is the maximum number of BAUs
Mmax=ceil(N);
results=zeros(N,N);
for N1=1:N
    for M1=1:N1
        number=0;
        if (M1==1)
            number=1;
        elseif (N1==M1)
            number=1;
        else
            number=results(N1-1,M1-1) + results(N1-M1,M1);
        end
        results(N1,M1)=number;
    end
end
LookUpTable=results;
```

FIG. 12

- GIVEN
    - NUMBER OF BAU $N_0 = 16$;
    - NUMBER OF ASSIGNMENT $M_0 = 3$;
    - THE ASSIGNMENT SCHEDULE $W = [2\ 3\ 11]$
- INITIALIZATION
    - $N = N_0 = 16$
    - $M = M_0 = 3$
    - INDEX = 0
- START
    - SINCE $W_{M_0-M+1} = W_1 > 1$, THEN
        - CODE = CODE $+ L_{(N-1)(M-1)} = 7$
        - $W = [2-1\ 3-1\ 11-1] = [1\ 2\ 10]$
        - $N = N-M = 13$
        - $M = M = 3$
    - SINCE $W_{M_0-M+1} = W_1 = 1$ THEN
        - CODE = CODE
        - $N = N-1 = 12$
        - $M = M-1 = 2$
    - SINCE $W_{M_0-M+1} = W_2 > 1$ THEN
        - CODE = CODE + $L_{(N-1)(M-1)} = 7+1 = 8$
        - $W = [1\ 2-1\ 10-1] = [1\ 1\ 9]$
        - $N = N-M = 10$
        - $M = M = 2$
    - SINCE $W_{M_0-M+1} = W_2 = 1$ THEN
        - CODE = CODE
        - $N = N-1 = 9$
        - $M = M-1 = 1$
        - SINCE $M = 1$
            - END
- RESULT: COMBINATION INDEX = CODE = 8

FIG. 14A

```
function Code=BAU_Encoding(BAU,LookUpTable)
N0=sum(BAU);
M0=length(BAU);
Code=0;
M=M0;
N=N0;
while (M>1)
    if (BAU(M0-M+1)==1)
        M=M-1;
        N=N-1;
    else
        Code=Code+LookUpTable(N-1,M-1);
        BAU(M0-M+1:end)=BAU(M0-M+1:end)-1;
        N=N-M;
    end
end
```

FIG. 14B

- GIVEN
    - NUMBER OF BAU $N_0 = 16$;
    - NUMBER OF ASSIGNMENT $M_0 = 3$;
    - THE COMBINATION INDEX = 8
- INITIALIZATION
    - $N = N_0 = 16$
    - $M = M_0 = 3$
    - CODE = 8
    - W = [0 0 0]
- START
    - SINCE CODE = 8 >= $L_{(N-1)(M-1)} = 7$, THEN
        - CODE = CODE - $L_{(N-1)(M-1)} = 1$
        - W = [0+1 0+1 0+1] = [1 1 1]
        - N = N-M = 13
        - M = M = 3
    - SINCE CODE = 1 < $L_{(N-1)(M-1)} = 6$ THEN
        - CODE = CODE = 1
        - W = [1+1 1 1] = [2 1 1]
        - N = N-1 = 12
        - M = M-1 = 2
    - SINCE CODE = 1 >= $L_{(N-1)(M-1)} = 1$
        - CODE = CODE - $L_{(N-1)(M-1)} = 0$
        - W = [2 1+1 1+1] = [2 2 2]
        - N = N-M = 10
        - M = M = 2
    - SINCE CODE = 0 < $L_{(N-1)(M-1)} = 1$
        - CODE = CODE
        - W = [2 2+1 2] = [2 3 2]
        - N = N-1 = 9
        - M = M-1 = 1
        - SINCE M=1
            - $W_{M_0} = N_0 - (W_1 + W_2) = 16 - (2+3) = 11$
        - END
- RESULT: ASSIGNMENT SCHEDULE = [ 2 3 11 ]

FIG. 17A

```
function BAU=BAU_Decoding(N0,M0,LookUpTable,Code)
BAU=zeros(1,M0);
M=M0;
N=N0;
while(M>1)
    if(Code>=LookUpTable(N-1,M-1))
        BAU(M0-M+1:end)=BAU(M0-M+1:end)+1;
        Code=Code-LookUpTable(N-1,M-1);
        N=N-M;
    else
        BAU(M0-M+1)=BAU(M0-M+1)+1;
        N=N-1;
        M=M-1;
    end
end
BAU(M0)=N0-sum(BAU(1:M0-1));
```

FIG. 17B

- N=16;
    - NUMBER OF NON-ZERO ELEMENTS = 144
    - MAXIMUM ELEMENT = 37 (6 BITS –> 1 BYTE)
    - TOTAL NUMBER OF BYTES = 144
- N=40;
    - NUMBER OF NON-ZERO ELEMENTS = 420
    - MAXIMUM ELEMENT = 3590 (12 BITS –> 2 BYTES)
    - TOTAL NUMBER OF BYTES = 144 + 2 x (420-144) = 696
- N = 80;
    - NUMBER OF NON-ZERO ELEMENTS = 3240
    - MAXIMUM ELEMENT = 1040014 (–> 3 BYTES)
    - TOTAL NUMBER OF BYTES = 696 + 3 x ( 3240 – 420) = 9156 = 9K
- N=120;
    - NUMBER OF NON-ZERO ELEMENTS = 7260
    - MAXIMUM ELEMENT = 97132873 (27 BITS – 4 BYTES)
    - TOTAL NUMBER OF BYTES = 9150+ 4 x (7260-3240) = 25 K

FIG. 18

- N=16 (M = 1, ..., 16)
  - 0 3 5 6 6 6 5 5 4 4 3 3 2 1 0 0
  - MAXIMUM: 6 BITS
- N=40 (M = 1, ..., 40)
  - 0 5 8 9 11 11 12 12 12 12 12 12 12 12 12 11 11 11 11
    10 10 10 9 9 8 8 7 7 6 6 5 5 4 4 3
    3 2 1 0 0
  - MAXIMUM: 12 BITS
- N=120 (M = 1, ..., 120)
  - 0 6 11 14 17 19 21 22 23 24 25 26 26 26 27 27 27 26 26
    27 27 27 27 27 27 27 27 26 26 26 26 26 26 27 26 23 20 16 12 5 4
    26 25 25 25 25 24 24 24 21 20 17 13 12 6 5 4
    23 22 22 22 21 21 21 18 17 13 12 6 6 4
    19 19 19 18 18 14 14 13 8 7 5 4
    15 15 15 14 9 9 8 7
    11 10 10 10 9 8 8
    3 3 2 1 0 0
  - MAXIMUM: 27 BITS

FIG. 19

| Type (binary) | Name | Description |
|---|---|---|
| 0000 | Persistent with Synchronous HARQ, Resource Allocation Block (PS-RAB) | Resource allocation on DRCH for persistent, synchronous HARQ. |
| 0001 | Persistent with RAS-HARQ, Resource Allocation Block (PR-RAB) | Resource allocation on DRCH for persistent, RAS-HARQ. Only appear in DCCH0. |
| 0010 | Non-persistent with RAS-HARQ, Resource Allocation Block Compressed Format (NPR-RAB-C) | Resource allocation on DRCH for non-persistent, RAS-HARQ. Compressed channel indexing format. |
| 0011 | Non-persistent with RAS-HARQ, Resource Allocation Block (NPR-RAB) | Resource allocation on DRCH for non-persistent, RAS-HARQ |
| 0100 | Persistent with Synchronous HARQ, Resource De-allocation Block (PS-RDB) | Resource de-allocation on DRCH for persistent, synchronous HARQ |
| 0101 | Persistent with RAS-HARQ, Resource De-allocation Block (PR-RDB) | Resource de-allocation on DRCH for persistent, RAS-HARQ. Only appear in DCCH0. |
| 0110 | HARQ Retransmission Allocation Block for Persistent with RAS-HARQ (PR-HRAB) | Resource allocation on DRCH for HARQ retransmission, for persistent, RAS-HARQ. Only appear in DCCH0 |
| 0111 | HARQ Retransmission Allocation Block for Non-Persistent with RAS-HARQ (NPR-HRAB) | Resource allocation on DRCH for HARQ retransmission, for non-persistent, RAS-HARQ |
| 1000 | LRCH Resource Allocation Block (LRCH-RAB) | Resource allocation on LRCH |
| 1001-1111 | Reserved | Reserved for future use |

FIG. 21

| Field | Number of Bits |
|---|---|
| Type | 4 |
| Number of Assignments, N | 2 |
| For (i=0; 1<N; 1++) { | |
| MAC ID | 10 |
| MCS | 4 |
| DRCH start index | 6 |
| Number of DRCHs | 6 |
| ResourceAdditionInd | 1 |
| } | |

FIG. 24

| Field | Number of Bits |
|---|---|
| Type | 4 |
| Number of Assignments, N | 4 |
| Start DRCH index | 6 |
| For(i=0; i<N, i++){ | |
| MAC ID | 10 |
| MCS | 4 |
| DRCH offset index | 5 |
| ResourceAdditionInd | 1 |
| } | |

FIG. 25

| Field | Number of Bits |
|---|---|
| Type | 4 |
| Start DRCH index | 6 |
| Number of DRCHs | 6 |
| Number of Assignments, N | 3 |
| Combination index | Variable (depends on N, number of DRCHs) |
| For (i=0; I<N; i++) { | |
| MAC ID | 10 |
| MCS | 4 |
| } | |

FIG. 26

| Field | Number of Bits |
|---|---|
| Type | 4 |
| Number of Assignments, N | 2 |
| For (i=0; i<N; i++) { | |
| MAC ID | 10 |
| MCS | 4 |
| DRCH start index | 6 |
| Number of DRCHs | 6 |
| NewPacketInd | 1 |
| } | |

FIG. 27

| Field | Number of Bits |
|---|---|
| Type | 4 |
| MAC ID | 10 |

FIG. 28

| Field | Number of Bits |
|---|---|
| Type | 4 |
| Resource allocation bitmap | Variable (configured by CCCH) |

FIG. 29

| Field | Number of Bits |
|---|---|
| Type | 4 |
| DRCH start index 1 | 5 |
| HARQ bitmap 1 | Variable (configured by CCCH) |
| DRCH offset index 2 | 5 |
| HARQ bitmap 2 | Variable (configured by CCCH) |
| DRCH offset index 3 | 5 |
| HARQ bitmap 3 | Variable (configured by CCCH) |

FIG. 30

| Field | Number of Bits |
|---|---|
| Type | 4 |
| Number of HARQ bitmaps, N | 3 |
| For (i=0; i<N, i++) { | |
| DRCH start index | 5 |
| HARQ bitmap i | Variable (configured by CCCH) |
| } | |

FIG. 31

| Field | Number of Bits |
|---|---|
| Type | 4 |
| Number of Assignments, N | 3 |
| For (i=0; i<N, i++) { | |
| MAC ID | 10 |
| LRCH resource allocation map | 8 |
| MCS | 4 |
| NewpacketInd | 1 |
| } | |

FIG. 32

RESOURCE ASSIGNMENT SYSTEMS AND METHODS

RELATED APPLICATIONS

This application claims the benefit of and is a National Phase Entry of International Application Number PCT/CA2006/002007 filed Dec. 8, 2006 and claims the benefit of U.S. Provisional Patent Application No. 60/748,555 filed Dec. 8, 2005, U.S. Provisional Patent Application No. 60/792,486 filed Apr. 17, 2006 and U.S. Provisional Patent Application No. 60/822,679 filed Aug. 17, 2006, all of which are hereby incorporated by reference in their entirety."

FIELD OF THE INVENTION

The present invention generally relates to the field of resource assignment, such as for assigning resources in wireless communications using orthogonal frequency division multiplexing (OFDM).

BACKGROUND

Orthogonal frequency division multiplexing (OFDM) is a form of multiplexing that distributes data over a number of carriers that have a very precise spacing in the frequency domain. The precise spacing of the carriers provides several benefits such as high spectral efficiency, resiliency to radio frequency interference and lower multipath distortion. Due to its beneficial properties and superior performance in multipath fading wireless channels, OFDM has been identified as a useful technique in the area of high data-rate wireless communication, for example wireless metropolitan area networks (MANs). Wireless MANs are networks to be implemented over an air interface for fixed, portable, and mobile broadband access systems.

In wireless communications using OFDM, a transmission resource used by a base station for transmission to a mobile station may be assigned as a number of basic access units (BAUs).

In order to enable small enough granularity to support certain types of traffic, such as voice over internet protocol (VoIP), the size of BAUs needs to be relatively small. Typically the result is a large number of BAUs within in a slot and, correspondingly, a large amount of resource assignment overhead.

As resources consumed by signaling cannot be used for transmitting data, reducing resource assignment overhead would allow a larger amount of data to be transmitted on the resource.

SUMMARY OF THE INVENTION

In one aspect, there is provided a method to assign resources comprising: associating an assignment schedule index with each of a plurality of assignment schedules, at least one of the plurality of assignment schedules containing multiple resource assignments; determining a number of resources to be assigned to each of at least one mobile station; determining an assignment schedule based on the number of resources assigned to each of the at least one mobile station; determining the assignment schedule index associated with the determined assignment schedule; and transmitting the assignment schedule index.

In some embodiments, the resources are orthogonal frequency division multiplexing resources.

In some embodiments, associating comprises generating the assignment schedule indices, such that no two assignment schedule indices are identical for the plurality of assignment schedules.

In some embodiments, associating comprises generating the assignment schedule indices, such that at least two assignment schedules are associated with a same assignment schedule index.

In some embodiments, the method further comprises transmitting an indicator of a number of mobile stations being assigned resources and a respective mobile station identifier for each of the at least one mobile station.

In some embodiments, the at least one of the plurality of assignment schedules containing multiple resource assignments comprises combinations of the number of resources assigned to each of the at least one mobile station without regard to an order of the assigned resources.

In some embodiments, the at least one of the plurality of assignment schedules containing multiple resource assignments comprises permutations of the number of resources assigned to each of the at least one mobile station.

In some embodiments, the method further comprises transmitting a bitmap for identifying which resources are assigned and which resources are not assigned.

In some embodiments, assigning resources further comprises using a resource assignment granularity selected from a plurality of resource assignment granularities, the method further comprising transmitting an indicator of the resource assignment granularity.

In some embodiments, determining the assignment schedule index associated with the determined assignment schedule comprises using a table for looking up the assignment schedule index based on the assignment schedule.

In some embodiments, using a table comprises using a table consisting of a sub-set of the assignment schedule indices associated with a sub-set of the assignment schedules.

In some embodiments, the step of associating an assignment schedule index further comprises using a recursive algorithm to determine the assignment schedule index based on the assignment schedule.

In some embodiments, the step of associating an assignment schedule index comprises using an algorithm to determine the assignment schedule index based on the assignment schedule, if the number of mobile stations and the number of N resources is less than a predetermined number.

In some embodiments, the step of associating an assignment schedule index further comprises deriving the indices using rules.

In some embodiments, respective assignment schedule indices are associated with each of a plurality of sub-sets of the assignment schedules, such that no two assignment schedule indices are identical for two assignment schedules.

In some embodiments, determining the assignment schedule index associated with the determined assignment schedule comprises using an algorithm based on a table of a number of possible combination assignment schedules for various numbers of resources and various numbers of mobile stations.

In some embodiments, the table has the following properties:
$L\{M, N\}=0$ for $M>N$;
$L\{M, N\}=1$ for $M=1$;
$L\{M, N\}=1$ for $M=N$; and
$L\{M, N\}=L\{N-1, M-1\}+L\{N-M, M\}$ for $1<M<N$;
wherein L is a number of possible combination assignment schedules for M mobile stations and N resources.

In another aspect, there is provided a base station adapted to implement the above embodiments.

In another aspect, there is provided a base station comprising: an encoder operable to: associate an assignment schedule index with each of a plurality of assignment schedules, at least one of the plurality of assignment schedules containing multiple resource assignments, determine a number of resources to be assigned to each of at least one mobile station, determine an assignment schedule based on the number of resources assigned to each of the at least one mobile station, and determine the assignment schedule index associated with the determined assignment schedule; and a transmitter for transmitting the assignment schedule index.

In another aspect, there is provided a method for a mobile station to be assigned resources comprising: associating an assignment schedule index with each of a plurality of assignment schedules, at least one of the plurality of assignment schedules containing multiple resource assignments; receiving an assignment schedule index; determining the assignment schedule based on the received associated assignment schedule index; and determining a number of resources which the mobile station is assigned based an the determined assignment schedule.

In some embodiments, the resources are orthogonal frequency division multiplexing resources.

In some embodiments, associating comprises generating the assignment schedule indices, such that no two assignment schedule indices are identical for the plurality of assignment schedules.

In some embodiments, associating comprises generating the assignment schedule indices, such that at least two assignment schedules are associated with a same assignment schedule index.

In some embodiments, the method further comprises receiving an indicator of a number of mobile stations being assigned resources and a respective mobile station identifier for each of the at least one mobile station.

In some embodiments, the at least one of the plurality of assignment schedules containing multiple resource assignments comprises combinations of the number of resources assigned to each of the at least one mobile station without regard to an order of the assigned resources.

In some embodiments, the at least one of the plurality of assignment schedules containing multiple resource assignments comprises permutations of the number of resources assigned to each of the at least one mobile station.

In some embodiments, the method further comprises receiving a bitmap for identifying which resources are assigned and which resources are not assigned.

In some embodiments, the method further comprises receiving an indicator of a resource assignment granularity selected from a plurality of resource assignment granularities.

In some embodiments, determining the assignment schedule associated with the received assignment schedule index comprises using a table for looking up the assignment schedule based on the received assignment schedule index.

In some embodiments, using a table comprises using a table consisting of a sub-set of the assignment schedule indices associated with a sub-set of the assignment schedules.

In some embodiments, the step of associating an assignment schedule index further comprises using a recursive algorithm to determine the assignment schedule index based on the assignment schedule.

In some embodiments, the step of associating an assignment schedule index comprises using an algorithm to determine the assignment schedule index based on the assignment schedule, if the number of mobile stations and the number of N resources is less than a predetermined number.

In some embodiments, the step of associating an assignment schedule index further comprises deriving the indices using rules.

In some embodiments, respective assignment schedule indices are associated with each of a plurality of sub-sets of the assignment schedules, such that no two assignment schedule indices are identical for two assignment schedules.

In some embodiments, determining the assignment schedule associated with the received assignment schedule index comprises using an algorithm based on a table of a number of possible combination assignment schedules for various numbers of resources and various numbers of mobile stations.

In some embodiments, the table has the following properties:

L{M, N}=0 for M>N;
L{M, N}=1 for M=1;
L{M, N}=1 for M=N; and
L{M, N}=L{N−1, M−1}+L{N−M, M} for 1<M<N;

wherein L is a number of possible combination assignment schedules for M mobile stations and N resources.

In another aspect, there is provided a mobile station adapted to implement the above method.

In another aspect, there is provided a mobile station comprising: a receiver for receiving an assignment schedule index; decoder operable to: associate an assignment schedule index with each of a plurality of assignment schedules, at least one of the plurality of assignment schedules containing multiple resource assignments; determine the assignment schedule based on the received associated assignment schedule index; and determine a number of resources which the mobile station is assigned based on the determined assignment schedule.

In another aspect, there is provided a method to assign resources to mobile stations comprising: assigning resources using a plurality of resource assignment blocks, wherein each assignment block is of a plurality of available types, wherein each type indicates transmitting using a respective unique set of one or more of the following characteristics: original transmission, retransmission, persistent assignment, non-persistent assignment, HARQ signaling, RAS-HARQ signaling, DRCH assignment, and LRCH assignment; and transmitting at least one of the plurality of resource assignment blocks.

In some embodiments, the resources are orthogonal frequency division multiplexing resources.

In some embodiments, the assignment block is selected from a group comprising of the following: a persistent with synchronous hybrid automatic repeat request (HARQ) resource assignment block, containing a type field and information content fields, the information content fields indicating a number of assignments, and for each mobile station being assigned resources a mobile station identifier, a modulation coding set, a distributed resource channel (DRCH) start index, a number of DRCHs, and a supplementary resource indicator; a persistent with resource adaptive synchronous (RAS)-HARQ resource assignment block, containing a type field and information content fields, the information content fields indicating a number of assignments, a DRCH start index, and for each mobile station a mobile station identifier, a modulation coding set, a DRCH offset index, and a supplementary resource indicator; a non-persistent with RAS-HARQ resource assignment block compressed format), containing a type field and an information content field, the information content field indicating a start DRCH index, a number of DRCHs, a number of assignments, an assignment schedule index, and for each mobile station, a mobile station identifier, and a modulation coding set; a non-persistent with RAS-HARQ resource assignment block, containing a type field and information content fields, the information content fields indicating a number of assignments, and for each mobile station, a mobile station identifier, a modulation coding set, a DRCH start index, a number of DRCHs, and a new packet identifier; a persistent with synchronous HARQ resource de-assignment block, containing a type field and an information content field, the information content field indicating a mobile station identifier for de-assignment; a persistent with RAS-HARQ resource de-assignment block, containing a type field and an information content field, the information content field indicating a resource allocation bitmap for de-assigning resources; a HARQ retransmission assignment block for persistent with RAS-HARQ, containing a type field and information content fields, the information content field indicating a DRCH start index, a first HARQ bitmap, a first DRCH offset index, a second HARQ bitmaap, a second DRCH offset index, and a third HARQ bitmap, wherein each bitmap indicates which mobile stations have retransmission packets for a group of assignments, a HARQ retransmission assignment block for non-persistent with RAS-HARQ, containing a type field and information content fields, the information content fields indicating a number of HARQ bitmaps and, for each mobile station, a DRCH start index and a HARQ bitmap; and a localized resource channel (LRCH) resource assignment block, containing a type field and information content fields, the information content fields indicating a number of assignments and, for each mobile station, a mobile station identifier, a LRCH allocation bitmap, a modulation coding set, and a new packet identifier, wherein the bitmap is used to locate resource assignments.

In some embodiments, the one of the plurality of assignment blocks indicates persistent; resource assignment and de-assignment using synchronous hybrid automatic repeat-request (HARQ) signaling, wherein the base station assigns a same persistent resource for both a first transmission and subsequent HARQ retransmissions.

In some embodiments, the one of the plurality of assignment blocks is used on a distributed resource channel (DRCH).

In some embodiments, the one of the plurality of assignment blocks indicates one of the following: initial persistent resource assignment, supplementary assignment to an already assigned persistent resource, and de-assignment of an existing persistent resource.

In some embodiments, used resources which result from retransmission being unnecessary in locations of those resources are used for other transmissions.

In some embodiments, the one of the plurality of assignment blocks indicates persistent resource assignment and de-assignment using resource adaptive synchronous hybrid automatic repeat-request (RAS-HARQ) signaling, wherein the base station assigns a resource for the first transmission and a different resource for retransmissions.

In some embodiments, the one of the plurality of assignment blocks is used on a distributed resource channel (DRCH).

In some embodiments, the one of the plurality of assignment blocks indicates one of the following: initial persistent resource assignment, supplementary assignment to an already assigned persistent resource, de-assignment of an existing persistent resource, and HARQ retransmission resource assignment.

In some embodiments, used resources which result from retransmission being unnecessary in locations of those resources are used for other transmissions.

In some embodiments, the one of the plurality of assignment blocks indicates non-persistent resource assignment using resource adaptive synchronous hybrid automatic repeat-request (RAS-HARQ) signaling, wherein the mobile station is assigned a non-persistent resource for the first transmission and a different resource for retransmissions.

In some embodiments, the one of the plurality of assignment blocks is used on a distributed resource channel.

In some embodiments, the one of the plurality of assignment blocks uses an assignment schedule index if the resource is contiguous with other resources in a group of resources being assigned.

In some embodiments, the one of the plurality of assignment blocks is a non-persistent with RAS-HARQ resource allocation block compressed format (NPR-RAB-C).

In some embodiments, the one of the plurality of assignment blocks uses an assignment schedule index if the resource is not contiguous with other resources in a group of resources being assigned.

In some embodiments, the one of the plurality of assignment blocks is a non-persistent with RAS-HARQ resource allocation block.

In some embodiments, the one of the plurality of assignment blocks indicates a non-persistent resource assignment using resource adaptive synchronous hybrid automatic repeat-request signaling, wherein the mobile station is assigned a resource for a first transmission and subsequent transmissions do not require signaling.

In some embodiments, the one of the plurality of assignment blocks is used on a localized resource channel.

In some embodiments, the method further comprises: receiving feedback using an at least three state feedback channel.

In some embodiments, a first state represents an acknowledgment to acknowledge correct reception of a traffic packet, a second state represents a negative-acknowledgment to indicate whether a traffic packet is in error and whether no traffic packet is received, and a third state represents an acknowledgment for acknowledging correct receipt of any one of the following; the persistent with RAS-HARQ resource assignment block, the persistent with RAS-HARQ resource de-assignment block, or the HARQ retransmission assignment block for persistent with RAS-HARQ.

In another aspect, there is provided a base station adapted to implement the above method.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which:

FIG. 3A is a table listing assignment schedules of various assignments to one, two and three mobile stations (and more specifically listing only assignment schedules without regard to alternative ordering of assignments);

FIGS. 3B and 3C are tables that differ from FIG. 3A by the addition of assignment schedule indices;

FIGS. 4A and 4B are schematic diagrams of example assignments of diversity channel resources that may be transmitted using an assignment schedule index;

FIG. 5A is a schematic diagram of example assignments of sub-band channel resources that may be transmitted using an assignment schedule index;

FIG. 5B is a table listing assignment schedules and their respective assignment schedule indices for use with FIG. 5A;

FIG. 7A is a look-up table that differs from FIG. 3B by the use of bold font to emphasize a sub-set of assignment schedules and their respective assignment schedule indices;

FIG. 7B is a look-up table that differs from FIG. 7A such that FIG. 7B contains only the emphasized sub-set of FIG. 7A;

FIGS. 8A, 8B, 8C, and 8D depict example comparisons of resource assignment overhead for assigning resources using assignment schedule indices;

FIG. 9 is a table of example modulation and coding parameters that may be transmitted using an assignment schedule index;

FIGS. 10A and 10B are example algorithms for generating a look-up table of assignment schedules and their respective assignment schedule indices;

FIG. 11 is a look-up table of the number of possible assignment schedules for various numbers of BAUs and mobile stations;

FIG. 12 is an example algorithm for generating the look-up table of FIG. 11;

FIG. 14A is an example of calculations performed in the encoding process of FIG. 13;

FIG. 14B is an example algorithm implementing the encoding process of FIG. 13;

FIG. 17A is an example of calculations performed in the decoding process of FIG. 16;

FIG. 17B is an example algorithm implementing the decoding process of FIG. 16;

FIG. 18 is an example listing of the number of bits required to store the look-up table of FIG. 11;

FIG. 19 is an example listing of maximum number of bits required to represent an assignment schedule index for various numbers of BAUs;

FIG. 21 is a table of types of resource assignment blocks for transmitting resource assignments;

FIG. 24 is a table defining persistent with synchronous HARQ resource assignment block;

FIG. 25 is a table defining a persistent with RAS-HARQ resource assignment block;

FIG. 26 is a table defining a non-persistent with RAS-HARQ resource assignment block compressed format;

FIG. 27 is a table defining a non-persistent with RAS-HARQ resource assignment block;

FIG. 28 is a table defining a persistent with synchronous HARQ resource de-assignment block;

FIG. 29 is a table defining a persistent with RAS-HARQ resource de-assignment block;

FIG. 30 is a table defining a HARQ retransmission assignment block for persistent with RAS-HARQ;

FIG. 31 is a table defining a HARQ retransmission assignment block for non-persistent with RAS-HARQ;

FIG. 32 is a table defining a localized resource channel (LRCH) resource assignment block;

DETAILED DESCRIPTION OF THE INVENTION

When allocating resources for OFDM transmission, a number of BAUs are available to be assigned by a base station for transmission to or from mobile stations. BAUs may refer to timeslots, frequency bands, or orthogonal codes. They may refer to OFDM sub-carriers or sub-band channel resources. They may be mixed sub-band channel and diversity channel resources, or purely diversity channel is resources, using channels with different characteristics, such as space, frequency, time, and/or polarization, to combat fading and interference. A two dimensional resource (time×frequency) is available. In some implementations, code spreading can be used to provide a third dimension. In any event, the BAU is the basic unit of allocation and is defined on an implementation specific basis. The methods and systems defined herein do not depend on a particular definition.

Figure 1:
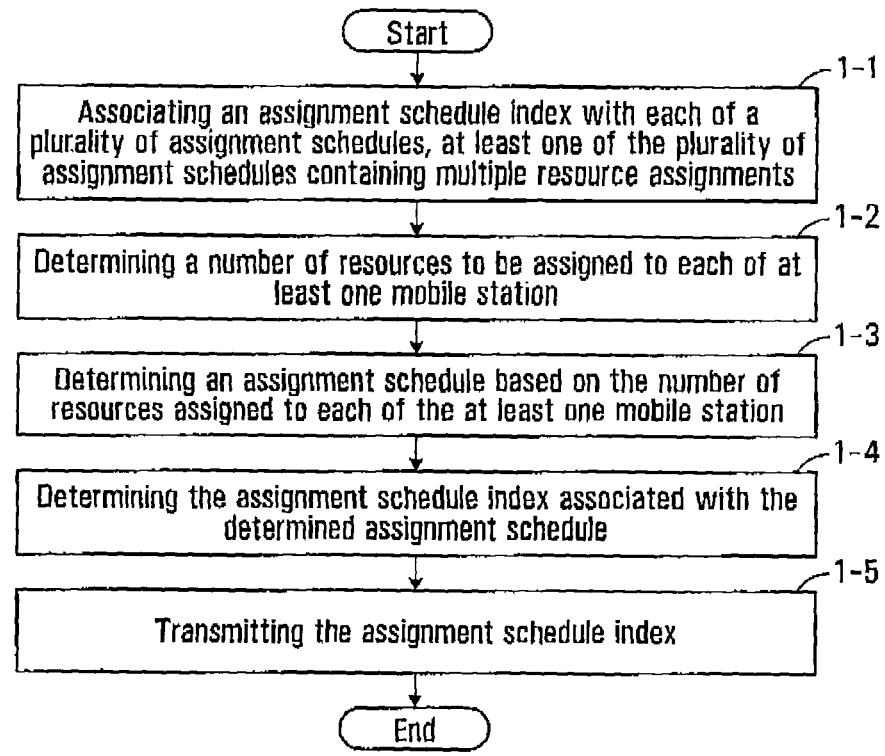
FIG. 1 is a flow diagram of a method for a base station to assign resources.

FIG. 1 is a flow diagram of a method for a base station to assign resources. At step 1-1, an assignment schedule index is associated with each of a plurality of assignment schedules, at least one of the plurality of assignment schedules containing multiple resource assignments. At step 1-2, a number of resources to be assigned to each of at least one mobile station is determined. At step 1-3, an assignment schedule based on the number of resources assigned to each of the at least one mobile station is determined. At step 1-4, the assignment schedule index associated with the determined assignment schedule is determined. At step 1-5, the assignment schedule index is transmitted. A more detailed description of the method follows.

Figure 2:
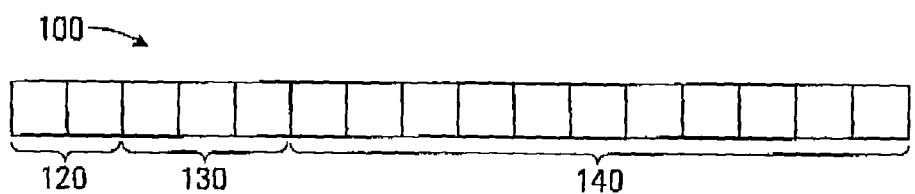
FIG. 2 is a schematic diagram of example assignments of 16 basic access units (BAUs) by a base station to three mobile stations.

To schedule assignments, a base station determines an assignment schedule W based on the number N of available BAUs and the number M of mobile stations. The assignment schedule W defines a number w of BAUs to be assigned to each of the M mobile stations, and may be represented as $W=[w_1, w_2, \ldots, w_M]$, where $w_1+w_2+\ldots w_M=N$. For example, when there are 16 BAUs 100 (N=16) available for assignment to three mobile stations (M=3), then one possible assignment schedule is [2, 3, 11]. This is depicted in FIG. 2, where two BAUs 120 are assigned to a first mobile station, three BAUs 130 are assigned to a second mobile station, and eleven BAUs 140 are assigned to a third mobile station. In FIG. 2, the available BAUs are illustrated as a set of boxes. This is a logical depiction and does not imply any structure in the BAUs.

Many assignment schedules are possible for assigning a given number N of BAUs to M mobile stations. FIG. 3A is a table of possible assignment schedules for assigning 16 BAUs to one mobile station, two mobile stations, or three mobile stations. Each column of the table defines the number of ways of assigning BAUs to a number of mobile stations. Referring to the first column, for one mobile station (M=1), there is one way to assign all 16 BAUs, namely assigning all of them to the mobile station. Referring to the second column, for two mobile stations (M=2), the first mobile station may be assigned one BAU and the second mobile station may be assigned 15 BAUs; the first mobile station may be assigned two BAUs and the second mobile station may be assigned 14 BAUs; and so on. The second column defines eight assignment schedules. Referring to the third column, for three mobile stations (M=3), the third column defines 21 assignment schedules. As described below, the base station may define any of a number of different types of assignment schedules.

In some embodiments, the base station defines assignment schedules without regard to alternative ordering of assignments. Such assignment schedules are referred to as combination assignment schedules. They include an assignment schedule for scheduling assignments in one order, but not assignment schedules for scheduling the same assignments in a different order. For example, the assignment schedules defined in the third column include [2, 3, 11], but not [3, 2, 11], [3, 11, 2], [11, 2, 3], and [11, 3, 2]. This keeps the number of possible assignments smaller, such that the assignments can be signaled with less overhead. Furthermore, this is not a limitation so long as mobile station identifiers are used to indicate a sequence of assignments as detailed below.

The base station may determine assignment schedules other than combination assignment schedules. In one example, BAUs are assigned on a fully loaded basis, such that all of the BAUs are assigned to mobile stations. In another example, they are assigned on a non-fully loaded basis, such that fewer than all of the available BAUs are assigned to mobile stations. In another example, one assignment schedule for scheduling assignments may include the same assignments in a different order as those of another assignment schedule. Such assignment schedules, referred to as permutation assignment schedules, include assignment schedules having different ordering, or different permutations, of the same assignments. For instance, [2, 3, 11], [3, 2, 11], [3, 11, 2], [11, 2, 3], and [11, 3, 2] are different permutations of the assignments of two BAUs, three BAUs and eleven BAUs.

After determining the assignment schedule, the base station determines an assignment schedule index associated with the determined assignment schedule. The assignment schedule index can be transmitted by the base station to mobile station, instead of the assignment schedule to assign resources, thus reducing resource assignment overhead. Each assignment schedule is associated with an assignment schedule index. A base station may use a look-up table to find the assignment schedule index based on the assignment schedule. The table lists an assignment schedule index associated with each of at least some of a plurality of assignment schedules containing multiple resource assignments. The look-up table is stored at the base station and at the mobile stations. However, it may be stored elsewhere or generate. The assignment schedules may be indexed according to any of a number of indexing schemes. The important thing with indexing is that whatever the approach, the base station and the mobile station understand the scheme so that each mobile station can determine the assignment schedule.

In some embodiments, the assignment schedules in a look-up table are indexed according to a universal indexing scheme, where all assignment schedules are indexed with a single indexing. No two assignment schedule indices are identical for the plurality of assignment schedules. This may, for example, proceed according to the number M of mobile stations. In this case, assignment schedules for a given number M mobile stations have assignment schedule indices that follow in sequence those associated with the last assignment schedule for M−1 mobile stations. Moreover, no two assignment schedules are associated with the same assignment schedule index. The assignment schedule indices may have a fixed size, as assignment schedule indices under the universal indexing scheme increase in sequence for each additional mobile station to be assigned resources. FIG. 3B is a look-up table, which differs from FIG. 3A by the addition of assignment schedule index according to the universal indexing scheme. Referring to the first and second columns, for one mobile station (M=1), assignment schedule [16] is associated with index '0'. Referring to the third and fourth columns, for two mobile stations (M=2), assignment schedule [1, 15] is associated with index '1'; assignment schedule [2, 14] is associated with index '2'; and so on up to index '8'. Referring to the fifth and sixth columns, for three mobile stations (M=3), the indexing continues with index '9'. As such, the assignment schedules are indexed sequentially for M=1 as '0', for M=2 from 1 to 8, and for M=3 from 9 to 29.

In some embodiments, the assignment schedules in a look-up table are indexed according to an independent indexing scheme, where each assignment schedule is indexed independently for each number M of mobile stations. Assignment schedules for M mobile stations may reuse the assignment schedule indices associated with the assignment schedules for M−1 mobile stations. At least two assignment schedules are associated with a same assignment schedule index. Two assignment schedules may be associated with the same assignment schedule index. The assignment schedule indices may have a variable size, as assignment schedule indices under the independent indexing scheme are reused for each additional mobile station to be assigned resources. FIG. 3C, which differs from FIG. 3A by the addition of assignment schedule indices, is a look-up table showing an example of the independent indexing scheme. Referring to the first and second columns, for one mobile station (M=1), assignment schedule [16] is associated with index '0'. Referring to the third and fourth columns, for two mobile stations (M=2), assignment schedule [1, 15] is associated with index '0'; assignment schedule [2, 14] is associated with index '1'; and so on up to index '7'. Referring to the fifth and sixth columns, for three mobile stations (M=3), the indexing starts from index '0'. As such, the assignment schedules are indexed independently for M=1 as '0', for M=2 from 0 to 7, and for M=3 from 0 to 20.

Two specific indexing schemes have been described. The assignment schedules may be indexed according to other indexing schemes. In one example, assignment schedules are indexed starting from an index other than '0'. In another example, they are indexed in multiples of a number, such that for one mobile station (M=1), assignment schedule [16] is assigned index '0'; for two mobile stations (M=2), assignment schedule [1, 15] is assigned index '2', assignment schedule [2, 14] is assigned index '4', and so on. In yet another example, the index is found in a larger look-up table listing assignment schedules for assigning BAUs to more than three mobile stations.

After the index is associated with the assignment schedule, the base station transmits the assignment schedule index to the mobile stations. The base station also transmits identification data, such as a mobile station identifier, as described below. Transmitting the index instead of the assignment schedule itself may decrease resource assignment overhead.

In some embodiments, the base station transmits the assignment schedule index and mobile station identifiers for each mobile station being scheduled, from which each mobile station can recover the assignment schedule. For example, for combination assignment schedules indexed according to the universal indexing scheme, depicted in FIG. 3B, for an allocation to M mobile stations, the BS sends M mobile station identifiers. As a very specific example, suppose a mobile station with MS_ID=1 is to receive three BAUs, a mobile station with MS_ID=2 is to receive two BAUs, and a mobile station with MS_ID=3 is to receive eleven BAUs. This corresponds with M=3, and the assignment schedule index in FIG. 3B is 17. The order of signaling the mobile stations is used to assign each mobile station a specific allocation. In this case the sequence of MS_IDs is MS_ID=2, MS_ID=1, MS_ID=3 corresponding to assignment schedule [2 3 11].

The mobile station for the first mobile station identifier (MS_ID=2) signaled recovers the assignment schedule [2, 3, 11] based on the assignment schedule index. More specifically, the mobile station is configured to deduce the assignment schedule from the assignment schedule index, and further deduce that it is assigned two BAUs based on the assignment schedule and the position of its MS_ID. The mobile station for the second MS_ID signaled, namely MS_ID=1, will recover the assignment schedule based on the assignment schedule index and determine that it is to receive three BAUs. Finally, the mobile station for the third MS-ID signaled, namely MS_ID=3, will recover the schedule based on the assignment schedule index and determine that it is to receive eleven BAUs.

In another example, for permutation assignment schedules indexed according to the universal indexing the base station transmits the assignment schedule index and mobile station identifiers, from which the mobile station can recover the assignment schedule. However, additional resource assignment overhead may result.

In some embodiments, the base station transmits the assignment schedule index, a number M of mobile stations, and M mobile station identifiers. For example, for assignment schedules indexed according to the independent indexing scheme, the mobile station may deduce the number M of mobile stations from the number of mobile station identifiers transmitted. Based on the assignment schedule index and M, it further deduces the assignment schedule. Based on the assignment schedule and its mobile station identifier, the mobile station determines how many BAUs are assigned to it.

In terms of transmitting an assignment schedule index for assigning BAUs, the base station may use any one of a number of assignment schedules and indexing schemes that is selected on a BAU-specific basis. For example, if two different BAU schemes are defined, they may use different assignment schedules and indexing schemes.

Several examples of the use of combination assignment schedules indexed according to the independent indexing scheme will be described with reference to FIGS. 4A and 4B. Referring to FIG. 4A, a total of 16 BAUs are assigned to three mobile stations on a fully loaded basis. One BAU is assigned to a first mobile station, five BAUs are assigned to a second mobile station, and ten BAUs are assigned to a third mobile station. With reference to the table of FIG. 3C, the base station determines an assignment schedule index '4' based on a combination assignment schedule [1, 5, 10], and transmits the assignment schedule index=4 (00100 in binary), M=3 (0011 in binary), and three mobile station identifiers. Referring to FIG. 4B, a total of 16 BAUs are assigned to two mobile stations on a non-fully loaded basis. Three BAUs are assigned for non-use (to a "null" mobile station), six BAUs are assigned to a first mobile station, and seven BAUs are assigned to a second mobile station. With reference to FIG. 3C, the base station determines assignment schedule index '16' (10000 in binary) based on assignment schedule [3,6,7], and transmits M=3 (0011 in binary), assignment schedule index=10000, and three mobile station identifiers. The first mobile station identifier is a "null" identifier that does not correspond to any actual mobile station.

The number of mobile stations, the assignment schedule index and the mobile station identifiers may be transmitted in different orders, such as transmitting the mobile station identifiers before the assignment schedule index for power saving purposes.

In some embodiments, the number N of available BAUs may change over time slowly or dynamically. In this case, the assignment schedule index is adjusted accordingly when required.

In some embodiments, the BAUs are constructed from sub-band channel resources, and indexing is performed on a per-sub-band basis. FIG. 5A is a schematic diagram of example assignments of such BAUs. Eight sub-bands are shown, each having four BAUs, such as BAU 418.

FIG. 5B shows an example of assignment schedules for a set of four BAUs that can be applied on a per-sub-band basis in allocating the resources of FIG. 5A. In this example, there is one combination for M=1, two combinations for M=2, one combination for M=3, and one combination for M=4, and this can be signaled using a three-bit index.

Referring back to FIG. 5A, the assignment schedules defined in Table 5B can be used to signal resource allocations for each sub-band. Specific assignments are illustrated by way of example. For sub-band 1 410, there is a null assignment for the first BAU, and the second, third and fourth BAUs are assigned to a mobile station with mobile station identifier U1.

To determine an assignment schedule index associated with a determined assignment schedule [1, 3], the base station consults the table of FIG. 5B. Referring to the second row, for M=2, the base station associates the assignment schedule [1, 3] with index '1' (001 in binary). This is repeated for each sub-band. In embodiments where the BAUs in a given sub-band are not fully assigned, those that are not assigned may be used for diversity BAU allocation. For example, FIG. 5A shows a number of sub-band BAUs 460 that are not allocated. Diversity, sub-channels can be defined and allocated using these resources.

After determining for each sub-band an assignment schedule index associated with a determined assignment schedule, the base station transmits the assignment schedule index.

In some embodiments, the base station transmits a bitmap to indicate which BAUs are not assigned to any mobile stations and which are assigned to mobile stations. The bitmap may be a series of bits. For sub-band 420, the combination [1, 3] is associated with index '1' (001 in binary), in the table of FIG. 5E. The bitmap 01 may be used to indicate, by virtue of the 0 in 01, that first BAU 418 is empty; and, by virtue of the 1 in 01, that the next three BAUs 422 are assigned. As such, the base station transmits assignment schedule index '001' and bitmap '01'. For sub-band 425, where all BAUs are empty, the base station transmits index '000' and bitmap '0'. For sub-band 430, based on assignment schedule [2, 2] the base station determines the assignment schedule index 2 associated with it and transmits the assignment schedule index '010' and bitmap '01'. For sub-band 435, it transmits index '000' and bitmap '0'; for sub-hand 440, index '001' and bitmap '10'; for sub-band 445, index '011' and bitmap '010'; for sub-band 450, index '011' and bitmap '101'; for sub-band 455, index '001' and bitmap '10'. In total, for this example 36 bits are used to transmit the assignments for the eight sub-bands. Transmitting this additional bitmap may be more efficient than transmitting a null mobile station identifier for BAUs that are not assigned.

In some embodiments, the base station may transmit a further bitmap to indicate whether the sub-bands have empty or assigned BAUs, in order to avoid transmitting the assignment schedule index '000' and bitmap '0' whenever a sub-band has empty BAUs. For example, for FIG. 5A the base station may transmit a sub-band bitmap '10101111' to indicate that the first, third, fifth, sixth, seventh and eighth sub-bands have assigned BAUs, while the second and fourth sub-bands have empty BAUs.

Figure 6A:
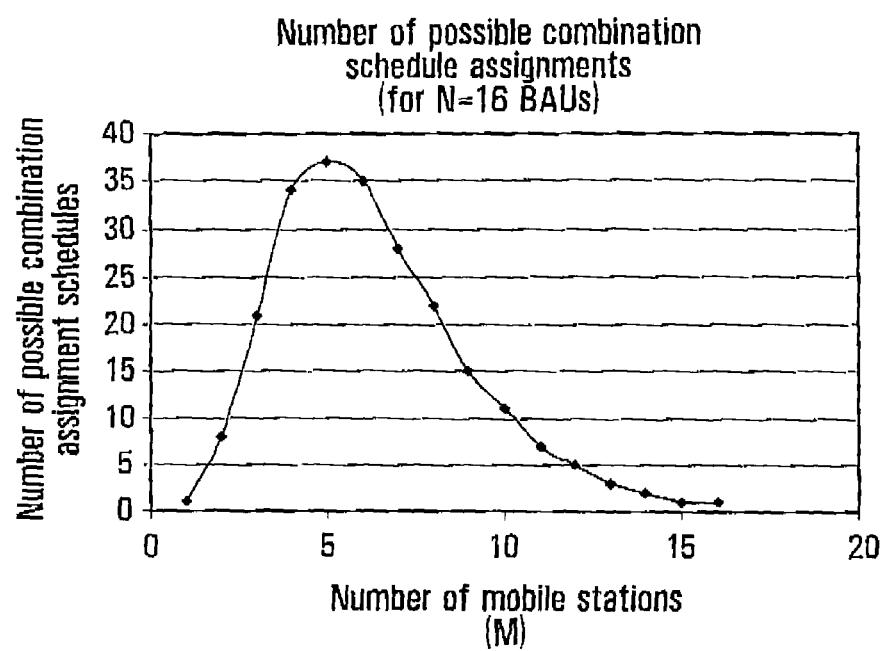
FIG. 6A is a plot of the number of possible assignment schedules for various numbers of mobile stations.

FIG. 6A is a plot of the number of possible combination assignment schedules for assigning 16 BAUs to various numbers M of mobile stations. For one mobile station (M=1), all BAUs are assigned to one mobile station, so there is only one combination assignment schedule; for two mobile stations (M=2), there are eight possible combination assignment schedules; for three mobile stations (M=3), there are 21; and so on. As shown, the maximum number of combinations occurs when there are five mobile stations (M=5).

Figure 6B:
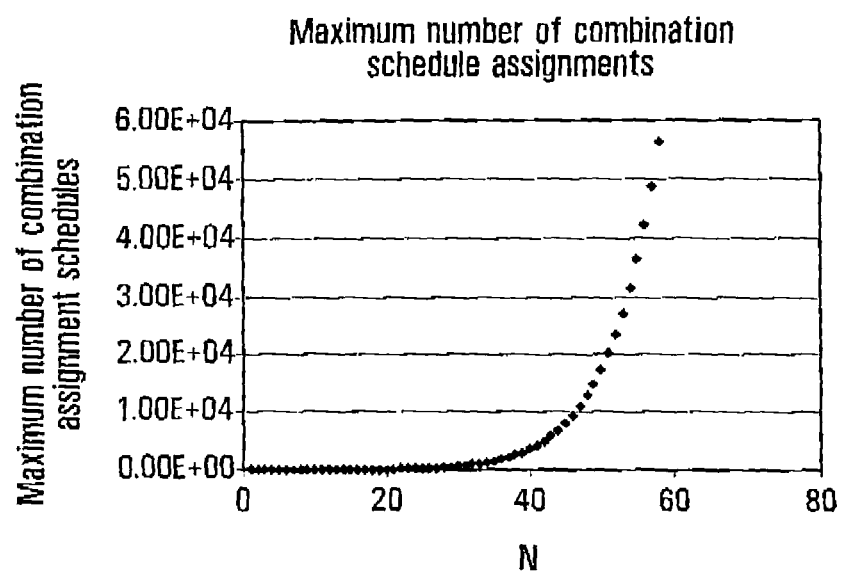
FIG. 6B is a plot of the maximum number of assignments for various numbers of BAUs.

As the number N of available BAUs increases, the maximum number of combination schedule assignments possible also increases, as shown in FIG. 6B. FIG. 6B is a plot of the maximum number of assignments for various numbers N of BAUs, where the maximum number can be approximated as $(1.488^{\wedge}N)^{\wedge}0.8164$.

Figure 6C:
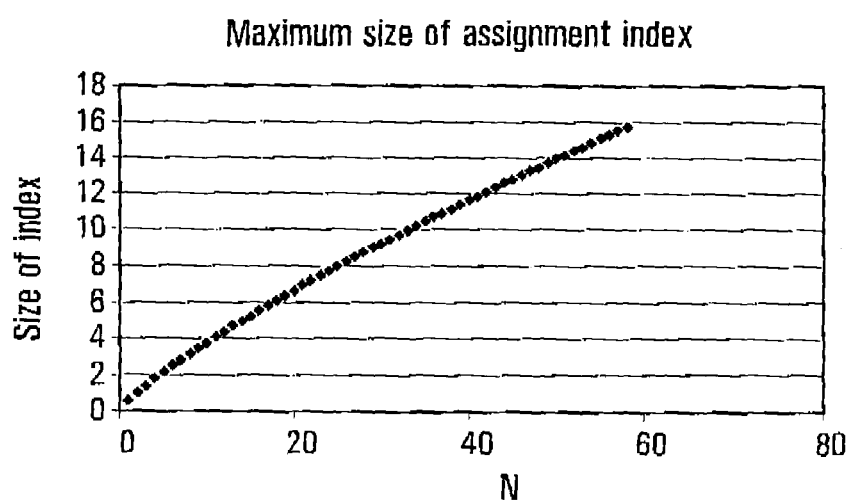
FIG. 6C is a plot of the maximum size of an assignment schedule index for various numbers of BAUs.

The maximum size of an assignment schedule index increases as well, as shown in FIG. 6C. FIG. 6C is a plot of the maximum size of an assignment schedule index for various numbers N of BAUs, where the maximum size of the combination indices can be approximated as $0.5734(N^{\wedge}0.8164)$.

In some embodiments, the number of combination assignment schedules and corresponding maximum size of the assignment schedule index are reduced, by limiting the maximum number of BAUs assigned to a mobile station. A base station may limit it on the basis of data availability and scheduling fairness.

In some embodiments, the number of combination assignment schedules is reduced by changing an assignment granularity "g", which represents a common factor in the number of BAUs assigned to all mobile stations intended to receive BAUs in a scheduling interval. This may occur for each scheduling interval, such as at the beginning of a scheduling interval. For example, for 16 BAUs and a granularity of '2', there are seven possible permutation assignment schedules ([2 14], [4 8], [6 10], [8 8], [10 6], [8 4], [14 2]), and only four possible even fewer combination assignment schedules ([2 14], [4 8], [6 10], [8 8]). When the granularity g is greater than '1', the size of assignment schedule index is reduced. For a 2-bit granularity assignment, it may be transmitted at appropriate times, for example, slowly or dynamically.

After receiving an assignment schedule index, a mobile station recovers the assignment schedule based on the assignment schedule index.

In some embodiments, the mobile station uses a look-up table to determine the assignment schedule based on the assignment schedule index. The mobile station might have a different look-up table for each number M of mobile station, for a given number of available BAUs. However, the total number of entries of assignment schedules and their respective assignment schedule indices for different values of N and M may become large.

In some embodiments, to limit the memory size of a look-up table, the N BAUs to be assigned to mobile stations are divided into smaller groups of size K, and each group is index independently. The number K is implementation specific and may be selected such that the memory size is reasonable and the maximum resource assignment size is acceptable. Once a mobile station obtains the number K from the base station, a look-up table for the group of K assignments may be generated as follows: the N BAUs are segmented into groups, where each group includes K BAUs. If the total number N of BAUs is not an integer multiple of K, then there are LL fewer than K BAUs in the last group. LL virtual BAUs are considered to be present, so as to make the last group appear to include K BAUs. The mobile station which is in the last group in the list of mobile station identifiers understands that the real number of BAUs assigned is actually K-LL. A look-up table for the group of K assignments based on a maximum of K BAUs is generated in the same manner as described previously.

For example, in a system configuration consistent with the 3GPP2 Standard (operating at 5 MHz, 10 OFDM symbol pairs, and a BAU size of 24 pairs of sub-carriers), 120 diversity BAUs are available for allocation. For a base station which selects K=40, the base station divides the 120 BAUs to be assigned into three groups of K=40 BAUs. It then indexes the assignment schedules of each group independently, such that a first group of assignment schedules for the first 40 BAUs is associated with a first group of assignment schedule indices, a second group of assignment schedules for the second 40 BAUs is associated with a second group of assignment schedule indices, and a third group of assignment schedules for the third 40 BAUs is associated with a third group of assignment schedule indices. The base station determines an assignment schedule index and a set of one or more mobile station identifiers to transmit for each group. For a combination assignment schedule index, 12 bits can be used to transmit the index for a set of 40 BAUs. A mobile station receiving the transmitted assignment schedule indices determines the assignment schedules from the assignment schedule index transmitted with that mobile station's identifier.

In some embodiments, for certain values of M, where M is small and close to N, the mobile station calculates combination assignments schedules in real time using an algorithm, instead of generating a look-up table.

In some embodiments, another scheme for reducing the size of a look-up table uses an algorithm and partial entries in the table. A corresponding saving in physical memory storage space of the mobile station is achieved. For certain values of M, the mobile station has a sub-set look-up table, where only particular entries having associated indices are included. When signaling a particular assignment schedule, the base station transmits the assignment schedule index for that assignment schedule, not withstanding whether the assignment schedule is part of the reduced sub-set. The mobile station receives the index. If it is in the reduced sub-set, it deduces the assignment schedule from the look-up table. To obtain the assignment schedules for an assignment schedule index that does not belong to the sub-set, the mobile station uses a recursive algorithm.

An example of using a sub-set look-up table will now be described with regard to FIGS. 7A and 7E. The sub-set table of FIG. 7B differs from full-set table of FIG. 7A, such that the sub-set table contains only particular assignment schedules and associated assignment schedule indices. In this example, the sub-set table of FIG. 7B contains assignment schedules associated with assignment schedule indices '0', '7', '13', '17', and '20'. A mobile station stores the sub-set table. On receiving an assignment schedule index transmitted by a base station, the mobile station examines the sub-set table. If the assignment schedule index is listed in the sub-set table, such as index=0, then the mobile station determines the assignment schedule based on the received index. If the assignment schedule index is not listed in the sub-set table, then the mobile station deduces the assignment schedule associated with the index using an algorithm and the sub-set table. For example, to deduce the assignment schedule associated with index=1, which is not listed in the sub-set table of FIG. 7B, the mobile station may use the assignment schedule associated with index=0, which is [1 1 14], add '1' to the second assignment, and subtract '1' from the third assignment, to obtain [1 2 13], the assignment schedule associated with index=1.

In some embodiments, another scheme for reducing the size of a look-up table is provided that uses rules for determining each element of an assignment schedule. Again, a corresponding saving in physical memory storage space of the mobile station is achieved. For a given N, there is provided a full look-up table for numbers of mobile stations to be assigned, from M=1 to $M_{max}$, where $M_{max}$ is the number of mobile stations to be assigned that has the maximum number of combination assignment schedules. For values greater than $M_{max}$, an algorithm derives the look-up tables using the look-up table for $M_{max}$. For example, for a value of M and index i, a combination assignment schedule can be expressed as $C_M[i] = [e_{M,i}(1)\ e_{M,i}(2)\ \ldots\ e_{M,i}(M)]$. The combination assignment schedule $C_2$ can be derived for i=0 to i=6 from the combination schedule assignment $C_{M=3}[i, i=0\ldots 6]$ by using the formula $[e_{2,i}(1)\ e_{2,i}(2)]=[e_{3,i}(2)\ e_{3,i}(3)]$; and for i=7 from $C_{M=3}[i, i=7]$ using the formula $[e_{2,7}(1)\ e_{2,7}(2)]=[e_{3,i}(1)+e_{3,i}(2)\ e_{3,i}(3)]$. The combination assignment schedule $C_4[i]=[e_{2,i}(1)\ e_{2,i}(4)]$ can be derived using the formula $C_{M=4}[i, i=0\ldots 14]=[e_{4,i}(1)\ e_{4,i}(4)]=[1\ e_{3,i}(1)\ e_{3,i}(2)\ e_{3,i}(3)-1]$; and the formula $C_{M=4}[i, i=12\ldots 17]=[e_{4,i}(1)\ e_{4,i}(4)]=[1\ e_{1,i+1}(1)\ e_{3,i+1}(2)\ e_{3,i+1}(3)-1]$.

In some embodiments, another scheme for reducing the size of a look-up table uses a combination of the first and second schemes described above. For N=40, the estimated size of memory used is 80 KB, which represents a size reduction of approximately 75% for a particular example.

In some embodiments, another scheme for reducing the size of an allocation index look-up table is provided that uses an algorithm to calculate the value of each element in a combination assignment schedule having M elements, where M equals the number of assignments. For a given N and M, a rule may be used to enable a mobile station to calculate the elements in the table using N, M and a combination assignment schedule index i. The rule may be stored or generated. For a given M, the j-th element in the ith combination of M is denoted as $e_i^M(j)$. For N=16 and M=1, the rule is $e_i^1(1)=N$, so that the j=1 element of the i=1 combination (i.e. the only assignment schedule for M=1) is $e_1^1(1)=16$. For M=2, the rules are $e_i^2(1)=i$ and $e_i^2(2)=N-i$. As such, in the first combination assignment schedule, the first element is $e_1^2(1)=1$ and the second element is $e_1^2(2)=16-1=15$. For M=3, the rules are $e_1^3(1)=1+[i/7]+[i/13]+[i/17]+[i/20]+[i/21]$, $e_i^3(2)=i\ \text{mod}\ (7+6[i/13]+4[i/17]+3[i/20])+1+[i/7]+[i/13]+[i/20]+[i/21]$, and $e_i^3(3)=N-(e_i^3(1)+e_i^3(2))$, where [x] denotes the operation of taking the integer of x. If the rule for all elements of all M exists, the look-up table does not need to be used and the elements for an assignment schedule are calculated in real time.

In some embodiments, the base station and mobile stations use an assignment schedule index as follows. The base station schedules mobile station traffic for each scheduling interval, and determines a particular resource assignment for the traffic. Based on the resource assignment, the base station determines a granularity g. The base station also checks the assignment schedules on a look-up table to determine a combination assignment schedule index. For diversity channel assignment, the base station transmits the granularity g, the number of assignments M if the independent indexing scheme is used, the mobile station identifier list, and the combination assignment schedule index. For sub-band channel assignment, the base station transmits the granularity g, the combination assignment schedule index, and the bitmap or corresponding mobile station identifiers.

The mobile station examines information transmitted by the base station. For diversity channel assignment, the mobile station checks the mobile station identifier. If the mobile station identifier is included in the mobile station identifier list broadcast by the base station, the mobile station determines the resource assignment by checking the look-up table stored on the mobile station or deriving the combination assignment schedule based on the assignment schedule index and the position of the mobile station's identifier in the mobile station identifier list. For sub-band channel assignment, the mobile station checks the combination assignment schedule index, the activation bitmap, and the mobile station identifiers to determine whether its traffic is scheduled. If its traffic is scheduled, then it checks the look-up table or derives the combination to find its resource assignment.

Figure 8B:
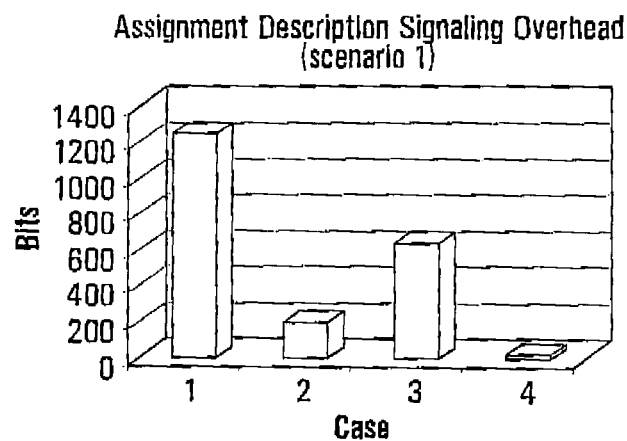
Figure 8C:
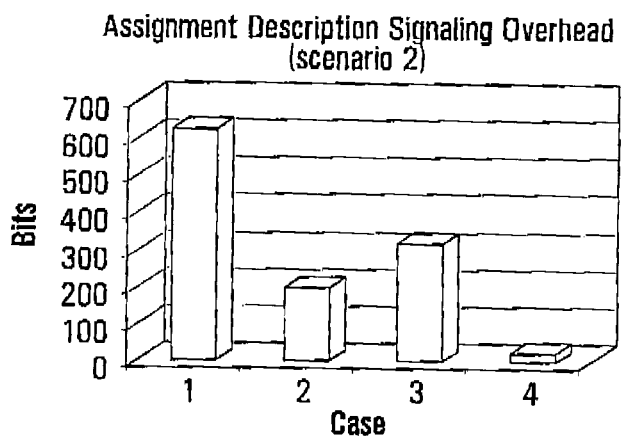
Figure 8D:
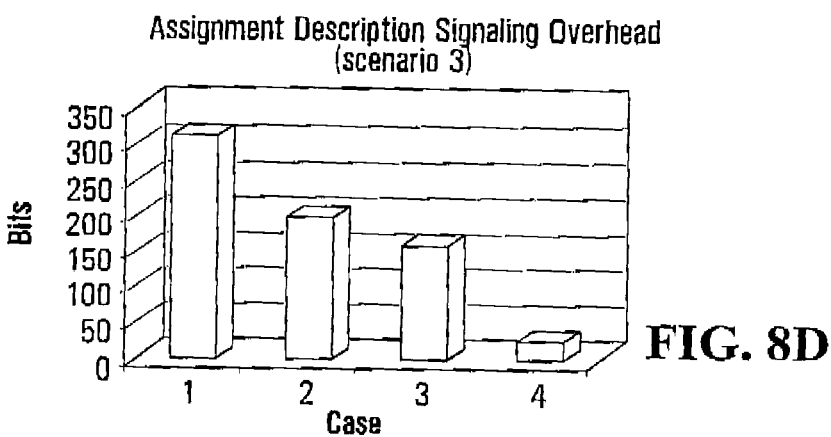

FIG. 8A is a table comparing resource assignment overhead using various resource assignment schemes, including an embodiment of the present invention for three signaling method scenarios. More specifically, it compares signaling overhead using 802.16 HARQ IE, tree bitmaps, tree node IDs, and combination assignment scheduling indices. As shown in the first row of the table, to signal assignments of 100 BAUs to 80 mobile stations, the overhead required is 1248 bits using 802.16 HARQ IE, 199 bits using tree bitmaps, 640 bits using tree node IDs, and less than 25 bits using assignment combination indices. As shown in the two other rows of the table of FIG. 8A, for the same number of BAUs and 40 and 20 mobile stations respectively, the overhead required to signal two other assignments is, again, the least number of bits when using the combination assignment schedule indices. FIGS. 8B, 8C and 8D are graphical representations of FIG. 8A.

In some embodiments, the combination assignment schedule index indicates not only resource assignment, but also modulation and coding parameters. FIG. 9 is a table of example modulation and coding parameters. For a given number of BAUs to be assigned, the table lists the number of sub-carriers, the code rate, modulation type, and number of information bits that are required to transmit on those BAUs. The base station defines the specific parameters that are to be used to transmit on the number of resources that it is assigning. In defining the packet size, the base station may select modulation and code rates such that the number of sub-carriers for each packet size, at the physical layer of the OSI (open system interconnection) model (PHY), is an integer multiple of 48 sub-carriers.

The base station transmits an assignment schedule index for the given number of BAUs to be assigned. A mobile station also has the table, and on receiving the transmitted assignment schedule index, the mobile station determines the number of BAUs from the index. Referring to the table, it also determines the parameters required for transmitting on those BAUs. In a specific example, for three available BAUs to be assigned, FIG. 9 indicates that 3×48 sub-carriers, a code rate of ⅓, QPSK modulation and 96 information bits are required to transmit on the three BAUs. A base station transmits an assignment schedule index. A mobile station receiving the index determines the number of BAUs that it is assigned based on the index, and determines from the table the parameters that it is to use to transmit on those three BAUs. Thus, the assignment schedule index indicates both resource assignment and PHY parameters at the same time. As a result, the resource assignment overhead to indicate PHY parameters may be removed.

As a specific example, if the assignment schedule index indicates that 13 BAUs are to be assigned to a particular mobile station, the table in FIG. 9 indicates that this will be transmitted using a code rate of ¾, 16-quadrature amplitude modulation (QAM), and a packet size of 1872. FIG. 9 is merely an example and that various combinations of coding rates, modulation schemes and data rates may be indexed. Antenna arrangement schemes, such as STTD, SM, and the like, may also be assigned using such a table. In other embodiments, for each number of BAUs that can be assigned to a given mobile station, those BAUs are transmitted using a corresponding predefined modulation and coding.

FIGS. 10A and 10B depict example algorithms for generating a look-up table of combination assignment schedules and their respective combination assignment schedule index.

FIG. 11 is a look-up table of the number of possible combination assignment schedules for various numbers N of BAUs and M mobile stations. The table is used in an encoding process to obtain an assignment schedule index, or in a decoding process to obtain an assignment schedule. Each number in the m-th column of the n-th row represents the number of possible ways N BAUs can be assigned to M mobile stations. This number of combinations is equal to L. For example, given three mobile stations and 16 BAUs, then there are 21 possible scheduling scenarios for allocating the 16 BAUs among the three mobile stations. The look-up table is recursively generated at the mobile stations and base stations, and may have the following properties: $L\{M, N\}=0$ for $M>N$; $L\{M, N\}=1$ for $M=1$; $L\{M, N\}=1$ for $M=N$; $L\{M, N\}=L\{N-1, M-1\}+L\{N-M, M\}$ for $1<M<N$. More generally, M and N are implementation specific.

FIG. 12 is an example algorithm for generating the look-up table of FIG. 11.

Figure 13:
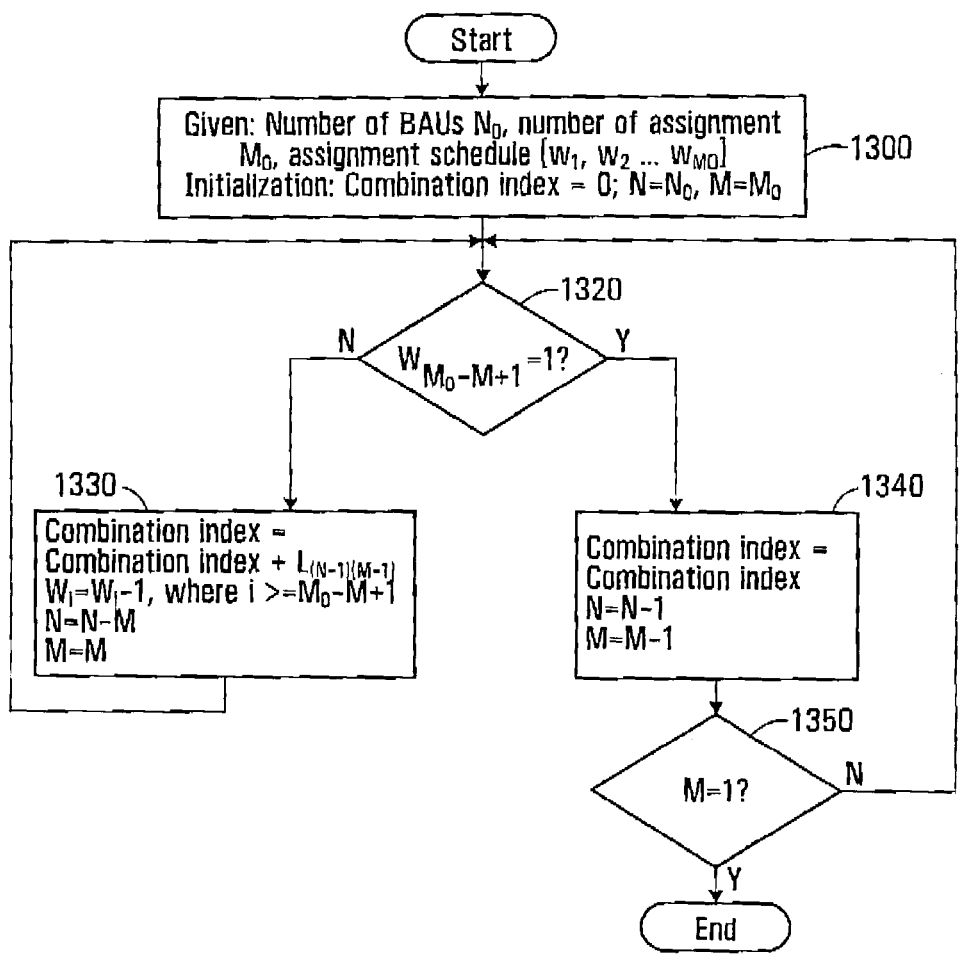
FIG. 13 is an example flow diagram illustrating an encoding process used by the base station for generating an assignment schedule index based on an assignment schedule.

FIG. 13 is an example flow diagram illustrating an encoding process used by the base station for generating an assignment schedule index based on a combination assignment schedule. The assignment schedule W, along with the number N of BAUs and the number M of mobile stations, are encoded to create a combination assignment schedule index. The encoding process uses the look-up table, an example of which is FIG. 11. Since the encoding process is based on the look-up table, the base station will store the look-up table.

At step 1300 the number of BAUs $N_0$, the number of assignments $M_0$, and the assignment schedule W are provided. At step 1320, a determination is made as to whether $W_{M0-M+1}=1$. If $W_{M0-M+1}=1$ (yes path, step 1320), then at step 1340 index=index, N=N−1, and M=M−1. If $W_{M0-M+1}\neq1$ (no path, step 1320), then at step 1330 index=index+$L_{(N-1)(M-1)}$, $w_i=w_i-1$ where $i>=M_0-M-1$, N=N−M, and M=M. After step 1330, step 1320 is repeated. After step 1340, a determination at step 1350 as to whether M=1. If M≠1 (no path, step 1350), then step 1320 is repeated. However, if M=1 (yes path, step 1350), then the encoding process ends.

FIG. 14A depicts example calculations performed in the encoding process of FIG. 13. In the FIG. 14A example, at step 1300, given are 16 BAUs ($N_0=16$), three assignments or mobile stations ($M_0=3$) and an assignment schedule [2 3 11] (w=[2 3 11]), then the following initializations are made: $N=N_0=16$, $M=M_0=3$, and index=[2 3 11]. At step 1320, a determination is made as to whether the statement $W_{M0-M-1}=1$ is true. In the FIG. 14A example, this corresponds to $w_{3-3+1}=w_1=2$, and so the statement is false. In the following part of FIG. 14A, an "index" is referred to as a "code". At step 1330, code=code+$L_{(N-1)(M-1)}$=0+$L_{(16-1)(3-1)}=L_{(15, 2)}$, which corresponds to the entry on the 15th row and second column of the table of FIG. 11, which is 7. As a result, code=7. Also at step 1330, $w_i=w_i-1$, where $i>M_0-M+1$ or $i>3-3+1$ or $i>1$. As such, the assignment schedule becomes W=[2−1 3−1 11−1]=[1 2 10]. Lastly, at step 1330, $N=N_0-M=16-3=13$, and $M=M_0=3$. The process repeats step 1320, where the determination corresponds to $w_{3-3+1}=w_1=1$, which is true. Proceeding to step 1340, code=code=7, $N=N_0-1=13-1=12$, and M=M−1=3−1=2. At step 1350, the determination is made as to whether M=1. As it does not (M=2≠1), then step 1320 is repeated. Again, the determination is made as to whether $w_{M0-N+1}-1$. The determination corresponds to $w_{3-2+1}=w_2=2$, which is not equal to 1. At step 1330, code=code+$L_{(N-1)(M-1)}=7+L_{(12-1)(2-i)}=7+L_{(11)(1)}=7+1=8$. Also, $w_i w_i-1$, where $i>=M_0-M+1$, or where $i>3-2+1=2$. As a result, W=[1 2−1 10−1]=[1 1 9]. Lastly, $N=N_0-M_0=12-2=10$, and $M=M_0=2$. At step 1320, the determination is whether $w_{3-2+1}=w_2=1$, which is true. At step 1340, code=code=8 (index=8), $N=N_0-1=10-1=9$, and $M=M_0-1=2-1=1$. At step 1350, M=1 is true, so the process ends. As a result, the assignment schedule index=8 is obtained based on the assignment schedule [2 3 11]. Once generated, the same combination assignment schedule index is transmitted to all the mobile stations. Upon receiving the combination assignment schedule index, each mobile station decodes the combination assignment schedule index to recover the assignment schedule.

FIG. 14B depicts an example algorithm implementing the encoding process of FIG. 13.

Figure 15:
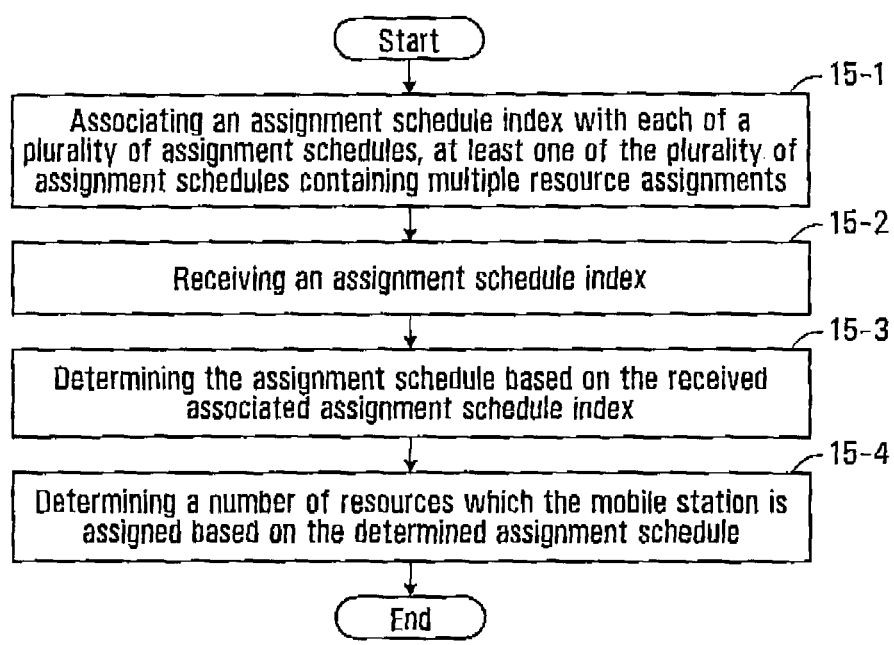
FIG. 15 in a flow diagram of a method for a mobile station to be assigned resources.

FIG. 15 is a method for a mobile station to be assigned resources. At step 15-1, an assignment schedule index is associated with each of a plurality of assignment schedules, at least one of the plurality of assignment schedules containing multiple resource assignments. At step 15-2, an assignment schedule index is received. At step 15-3, the assignment schedule based on the received associated assignment schedule index is determined. At step 15-4, a number of resources which the mobile station is assigned based on the determined assignment schedule is determined. A more detailed description of the method follows.

Figure 16:
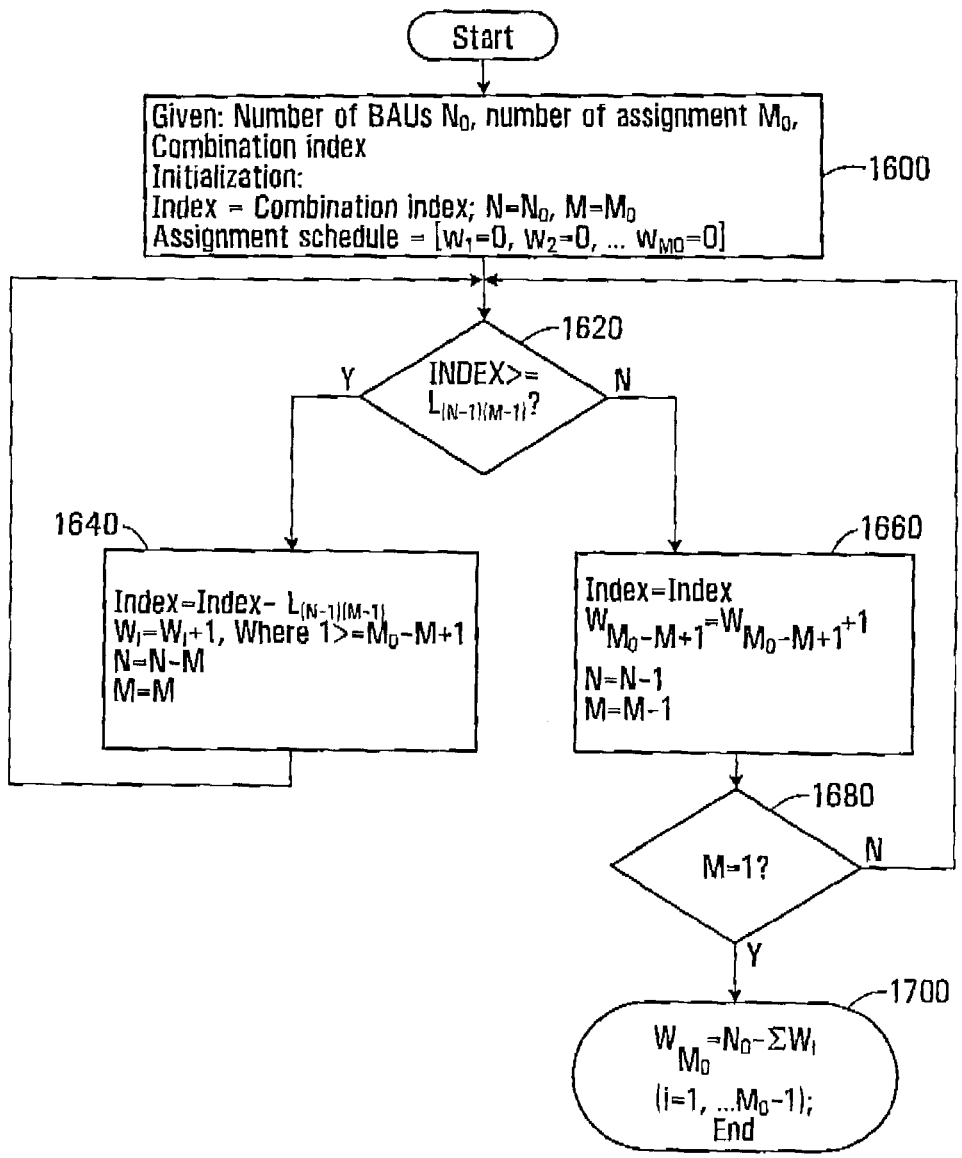
FIG. 16 is an example flow diagram illustrating a decoding process used by a mobile station for recovering the assignment schedule based on the assignment schedule index.

FIG. 16 is an example flow diagram illustrating a decoding process used by a mobile station for recovering the assignment schedule based on the assignment schedule index. The decoding process recovers W, based on the combination assignment schedule index, the number N of BAUs, and the number M of mobile stations. Again, the decoding process uses the look-up table of FIG. 11. Since the decoding process is based on the look-up table, the mobile station also stores the look-up table. At step 1600 a number $N_0$ of BAUs to be assigned, a number M of assignments, and an assignment schedule index to decode are provided and initialized as follows: $N=N_0$, $M=M_0$, and index=index. At step 1320, a determination is made as to whether index>=$L_{(N-1)(M-1)}$. If it is, then the process continues with step 1640, otherwise it continues with step 1660. At step 1640, the index is set to index=$L_{(N-1)(M-1)}$. Other values are calculated, namely $W_i=W_i+1$, where $1>=M_0-M+1$; $N=N-M$; and $M=M$. Step 1640 loops back to step 1620. At step 1660, index=index, and other values are calculated namely $W_{M0-M+1}=W_{M0-M+1}+1$; $N=N-1$; and $M=M-1$. At step 1680, a determination is made as to whether $M=1$. It is, then the process continues with step 1620, otherwise it continues with final step 1700. At step 1700, the assignment schedule is obtained as $W_{M0}=N_0$—(all the entries of W for i=1 to $M_0-1$), and the process terminates.

FIG. 17A is an example of calculations performed in the decoding process of FIG. 16. At step 1600, for a given 16 available BAUs ($N_0=16$), three mobile stations ($M=3$), and assignment schedule index=8, they are initialized as $N=N_0=16$, $M=M_0=3$, code=8, and assignment schedule as W=[0 0 0]. At step 1620, the determination is made as to whether code$>=L_{(N-1)(M-1)}$. In this FIG. 17A example, it corresponds to code=8$>=L_{(16-1)(3-1)}=L_{(15)(2)}=7$, and the statement is true. The process continues with step 1640, where code=code-$L_{(N-1)(M-1)}$, which corresponds in this example to code=8−7=1. Also, as $w_iw_j+1$ where $1>=M_0-M+1=3-3+1$, then W=[0+1 0+1 0+1]=[1 1 1]. Other values are also set: $N=N-16-3$, and $M=M=3$. The process repeats step 1620, where the determination becomes code=1$>=L_{(13-1)\ (3-1)}=L_{(12)(2)}=6$, which is false. At step 1660, code=code=1, and $M_{M0-M+1}=W_{M0-M+1}+1$ which corresponds to W=[1+1 1 1]=[2 1 1]. Also, N=N−1=12, and M=M−2=2. At step 1680, the determination is made as to whether M=1. As it is false, the process repeats step 1620, whose statement is true, as code=1>=1. At step 1640, code=code-$L_{(N-1)(M-1)}=0$, W=[2 1+1 1+1]=[2 2 2], N=N−M=10, and M=M=2. At step 1620 the test is false, as code=0<1. At step 1660, code=code, W=[2 2+1 2]=[2 3 2], N=N−1=9, and M=M−1=1. The test at step 1680 is true, as M=1, and finally at step 1700 $w_{M0}=w_3=N_0-(w_1+w_2)=16-(2+3)=11$. As a result, the mobile station recovers the assignment schedule [2 3 11].

FIG. 17B is an example algorithm implementing the decoding process of FIG. 16.

The number of possible assignment schedules for a given pairing of available BAUs and the maximum number of mobile stations being scheduled controls the size of the combination assignment schedule index. In one embodiment, the minimum number of bits necessary to identify each possible combination assignment schedule is used to transmit the selected combination assignment schedule index to the mobile stations. For the example above where there are three mobile stations and 16 BAUs, 21 combination assignment schedules exist. As such, there are 21 possible combination assignment schedule indices requiring at least a five-bit word to convey all possible combination assignment schedule indices to the mobile stations, as a 5-bit word allows for a maximum of 32 combination assignment schedule indices ($2^5=32$). As another example, assume that there are three mobile stations and 14 BAUs, which results in 16 possible combination assignment schedules. As such, a four-bit word would convey all possible combination assignment schedule indices to the mobile stations, as a four-bit word allows for a maximum of 16 combination assignment schedule indices ($2^4=16$). Resource assignment overhead is further reduced by only transmitting the number of bits necessary to convey all possible combination assignment schedule indices to the mobile stations for the current number of mobile stations and BAUs.

FIG. 18 is an example of the number of bits required to store at the mobile station the look-up table of FIG. 11.

FIG. 19 indicates a maximum number of bits required to represent an assignment schedule index according to the universal indexing scheme for various numbers of BAUs. For example, the bit values for N=16 correspond to the number of bits for the maximum number of combination assignment schedule indices associated with the combination assignment schedules in the bottom row of FIG. 11.

Figure 20:
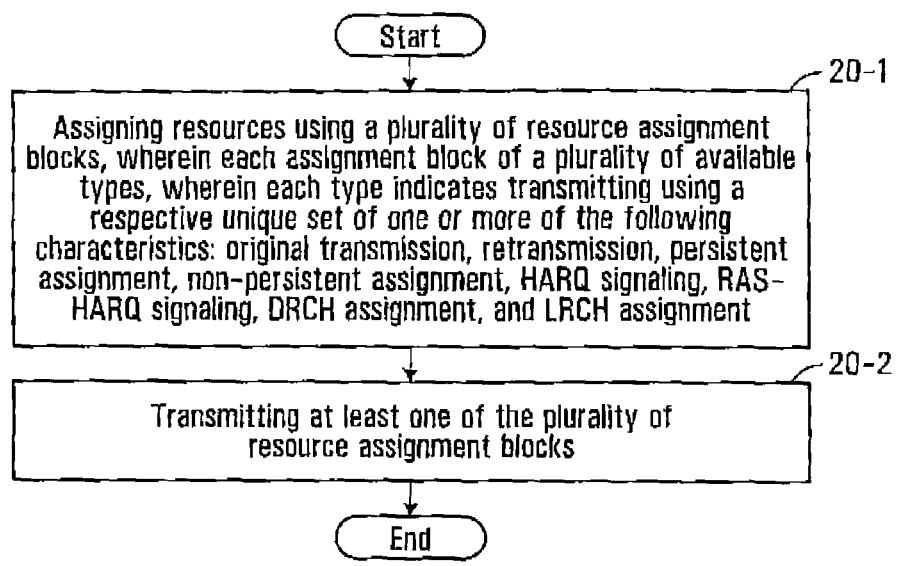
FIG. 20 is a flow diagram of a method for a base station to assign resources to mobile stations using assignment blocks.

FIG. 20 is a flow diagram of a method for a base station to assign resources to mobile stations using assignment blocks. At step 20-1, resources are assigned using a plurality of resource assignment blocks, wherein each assignment block is of a plurality of available types, wherein each type indicates transmitting using a respective unique set of one or more of the following characteristics: original transmission, retransmission, persistent assignment, non-persistent assignment, HARQ signaling, RAS-HARQ signaling, DRCH assignment, and LRCH assignment. At step 20-2, at least one of the plurality of resource assignment blocks is transmitted. A more detailed description of the method follows.

The base station may transmit assignment blocks on a data control channel (DCCH) to mobile stations to multiplex between mobile stations using different types of BAUs.

One of the transmission characteristics that the base station may indicate is a type of BAU a mobile station is being assigned. To do so, the base station transmits an indicator of the type of BAU. In a specific example, the base station may assign BAUs on a distributed resource channel (DRCH), where BAUs are distributed, and transmit a DRCH bitmap to indicate the assignment. It may assign BAUs on a localized resource channel (LRCH), where BAUs are localized, and transmit a LRCH bitmap to indicate the assignment. The DRCH bitmap may be used for a first multiplexing mode by LRCH assigned mobile stations to determine which DRCHs are assigned. The LRCH bitmap may be used for a second multiplexing mode by DRCH assigned mobile stations to determine which LRCHs are assigned. The bitmap may be transmitted in a particular channel, such as DCCH0, which may be a robust DCCH. Multiplexing mode determination at the mobile station is implicit based on a last DRCH index assigned in DCCH0. In this specific example, assignment blocks are transmitted in frames. However, they are not limited to this particular scheme, and other modulation schemes may be used. The last DRCH in a frame is assigned to a user that is signaled by DCCH0. If the last DRCH index is greater than a predetermined threshold, the second multiplexing mode is assumed. Otherwise, the first multiplexing mode is assumed.

The bitmap and assignment blocks may be transmitted in various arrangements for transmission. In one example, the bitmap is arranged at the end of DCCH0 after all the assignment blocks. As such, they are arranged as a first assignment block, a second assignment block, and so on, and at the end the bitmap. In another example, the bitmap is arranged after an assignment block which assigns DRCH BAUs. Thus, they are arranged as a first assignment block for DRCH assignments, and so on up to an N-th assignment block for DRCH, the bitmap, and an N+1-th assignment block for LRCH. Under both examples, the bitmap may be variable, based implicitly on the first or second multiplexing mode. The base station may use the same arrangement for both multiplexing modes, or may use different arrangements for both.

Assignment blocks may be grouped into four categories: persistent resource assignment and de-assignment using synchronous hybrid automatic repeat request (HARQ) signaling for DRCH; persistent resource assignment and de-assignment using resource adaptive synchronous (RAS)-HARQ signaling for DRCH; non-persistent resource assignment using RAS-HARQ signaling for DRCH; and non-persistent resource assignment using RAS-HARQ signaling for LRCH.

FIG. 21 lists nine assignment blocks, belonging to these categories, that the base station may transmit to indicate characteristics. Each assignment block contains a type field which identifies the block; and information content fields identifying resource assignment information. The assignment blocks listed in FIG. 21 are: a persistent with synchronous HARQ resource assignment block (PS-RAB) associated with type 0000; a persistent with RAS-HARQ resource assignment block (PR-RAB) 0001; a non-persistent with RAS-HARQ resource assignment block compressed format (NPR-RAB-C) 0010; a non-persistent with RAS-HARQ resource assignment block (NPR-RAB) 0011; a persistent with synchronous HARQ resource de-assignment block (PS-RDB) 0100; a persistent with RAS-HARQ resource de-assignment block (PR-RDB) 0101; a HARQ retransmission assignment block for persistent with RAS-HARQ (PR-HRAB) 0110; a HARQ retransmission assignment block for non-persistent with RAS-HARQ (NPR-HRAB) 0111; and a LRCH resource assignment block (LRCH-RAB) 1000. Other assignment blocks may be used and associated with a respective type, for example, from 1001 to 1111.

A description of each category, a listing of the assignment blocks that implement it, and a detailed description of each assignment block follows.

Figure 22:
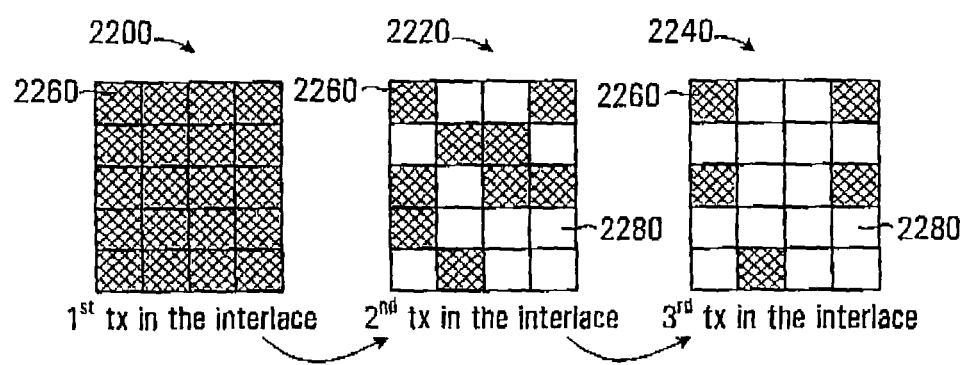
FIG. 22 depicts resource allocation diagrams for a persistent with synchronous hybrid automatic repeat request (HARQ) resource assignment and de-assignment scheme.

The first category, persistent resource assignment and de-assignment using synchronous hybrid automatic repeat request (HARQ) signaling for DRCH, is now described with reference to FIG. 22. FIG. 22 depicts a two dimensional resource assignment, with time in the horizontal direction and BAU in the vertical direction, for a first transmission 2200, a second transmission 2220, and a third transmission 2240 over three consecutive transmission durations. The BAUs that are assigned for transmission are shown using hash marks. In the first category, a base station assigns a mobile station a same persistent resource for multiple transmissions. In the FIG. 22 example, BAU 2260 is assigned persistently to a mobile station. BAU 2260 is used to send data, such as packets, to the mobile station in first transmission 2200 for an initial persistent assignment as well as in second transmission 2220 and third transmission 2240 for first and second HARQ retransmissions, respectively.

For the first category, the base station may specifically indicate any of the following by transmitting an assignment block; initial persistent assignment by transmitting PS-RAS 0000; supplementary assignment to the already assigned persistent resource by transmitting PS-RAB 0000; and de-assignment of existing persistent resource de-assignment using synchronous HARQ signaling by transmitting PS-RDB 0100. Time-frequency resource "holes" 2280 left-over by transmissions, in particular BAUs that are successfully received by the mobile station, can be left un-filled or filled by new transmissions using best effort traffic by transmitting non-persistent resource assignment with RAS-HARQ (NPR-RAB).

Figure 23:
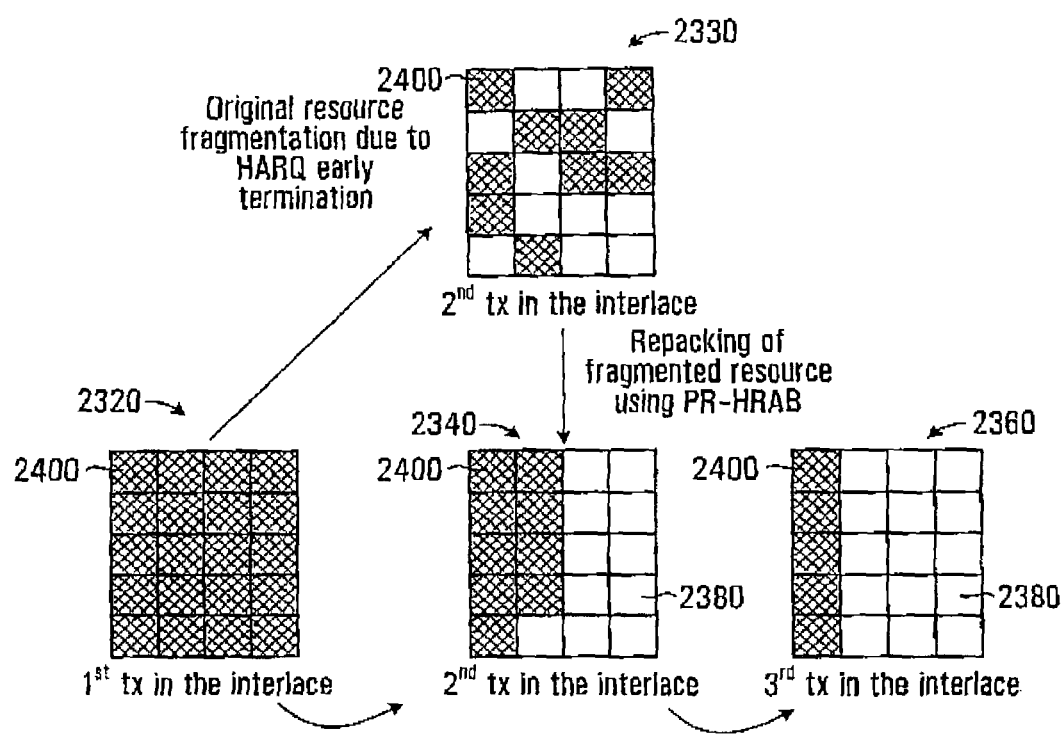
FIG. 23 depicts resource allocation diagrams for a persistent resource adaptive synchronous (RAS)-HARQ resource assignment and de-assignment scheme.

The second category, persistent resource assignment and de-assignment using resource adaptive synchronous (RAS)-HARQ signaling for DRCH, is now described with reference to FIG. 23. A base station assigns a mobile station a persistent resource for a first transmission 2320. Subsequent HARQ retransmissions 2330 and 2360 may occur on a fixed time interval, and have the same modulation coding set (MCS) as first transmission 2320, but a different resource than first transmission 2320. The objective is to re-pack the resources into a repacked transmission 2340 in a manner to ensure un-filled resource are contiguous. This minimizes resource assignment overhead associated with new assignments to best effort users, as new assignments do not use as much location information to assign non-contiguous resources. This scheme also allows "holes" 2380 to be re-filled by other persistent mobile stations.

For the second category, the base station may specifically indicate any of the following by transmitting an assignment block: initial persistent resource assignment with RAS-HARQ by transmitting PR-RAE 0001; a supplementary assignment to the already assigned persistent resource by transmitting PR-RAB 0001; de-assignment of the existing persistent resource by transmitting PR-RDB 0101; and a HARQ retransmission resource assignment by transmitting PR-HRAB 0110.

The third category, non-persistent resource assignment using RAS-HARQ signaling for DRCH, is now described. The base station assigns a mobile station a non-persistent BAU for the first transmission. Compressed resource indexing using NPR-RAB-C (non-persistent resource assignment with RAS-HARQ compressed format) may be used if resources in the frame are contiguous to one another. Uncompressed resource indexing using NPR-RAB may be used if resources in the frame are fragmented from each other. Subsequent HARQ retransmission may occur on a fixed time interval, and have the same MCS as the first transmission, but a different resource than the first transmission. The objective is to re-pack the resources in a manner to ensure un-filled resources are contiguous and to minimize the signaling overhead associated with new assignments to best effort users.

For the third category, the base station may transmit NPR-HRAB 0111, or transmit NPR-HRAB for a particular mobile station such that it is transmitted on the same DCCH as the one used for signaling the first transmission.

The fourth category, non-persistent resource assignment using RAS-HARQ signaling for LRCH, is now described. The mobile station is assigned a LRCH resource for the first transmission using LRCH-RAB 1000. Subsequent retransmissions can be fully synchronous. As such, no signaling would be required. The RAS, such as LRCH-RAB 1000, may be sent in a retransmission slot to re-assign a LRCH resource for retransmission.

The assignment blocks listed in FIG. 21 will now be described in more detail with reference to their respective Figure.

FIG. 24 is an example of PS-RAB 0000 (persistent with synchronous HARQ resource assignment block). The block contains a type field to identify the type of assignment block, for example using the binary numbers listed in the first column of FIG. 21. It also contains information fields, which include the number of assignments. The information fields also include, for each mobile station being assigned resources, a mobile station's MAC identification (MAC ID), a MCS (modulation coding set), a DRCH start index, a number of DRCHs, and a supplementary resource indicator to identify if the resource assignment is an assignment of a supplementary resource or not (ResourceAdditionInd). For example, in the 1-bit "ResourceAdditionInd" a '0' indicates the resource assignment is not supplementary and a '1' indicates the resource is supplementary. The mobile station locates the resource assignment using the DRCH start index and the number of DRCHs.

FIG. 25 is an example of PR-RAB 0001 (persistent with RAS-HARQ resource assignment block). Its information fields include a number of assignments and a start DRCH index. Also, for each mobile station, they include its MAC ID, a MCS, a DRCH offset index, and a supplementary resource indicator. The mobile station locates the resource assignment using the start DRCH index and the DRCH offset index.

FIG. 26 is an example of NPR-RAB-C 0010 (non-persistent with RAS-HARQ resource assignment block compressed format). Its information fields include a start DRCH index, a number of DRCHs, a number of assignments, and an assignment schedule index, such as the combination assignment schedule index described above. They also include, for each mobile station, its MAC ID and a MCS. The mobile station locates the resource assignment using the start DRCH index and the number of DRCHs.

FIG. 27 is an example of NPR-RAB 0011 (non-persistent with RAS-HARQ resource assignment block). Its information fields include a number of assignments. They also include, for each mobile station, its MAC ID, a MCS, a DRCH start index, a number of DRCHs, and a new packet identifier. The mobile station locates the resource assignment using the start DRCH index and the number of DRCHs.

FIG. 28 is an example of PS-RDB 0100 (persistent with synchronous HARQ resource de-assignment block). Its information fields include a MAC ID from which resources will be de-assigned.

FIG. 29 is an example of PR-RDB 0101 (persistent with RAS-HARQ resource de-assignment block). Its information fields include a resource allocation bitmap for de-assigning resources.

FIG. 30 is an example of PR-HRAB 0110 (HARQ retransmission assignment block for persistent with RAS-HARQ). Its information fields include a DRCH start index, a first HARQ bitmap, a first DRCH offset index, a second HARQ bitmap, a second DRCH offset index, and a third HARQ bitmap. A HARQ bitmap is referred to as "ACK/NAK Echo". A HARQ bitmap indicates which mobile stations have retransmission packets for a group of assignments. It also indicates the sequential resource assignment and retransmission packets. HARQ bitmap 'n' represents a mobile station grouping of the nth transmission. The mobile station locates the resource assignment using the start DRCH index.

FIG. 31 is an example of NPR-HRAB 0111 (HARQ retransmission assignment block for non-persistent with RAS-HARQ). Its information fields include a number of HARQ bitmaps, and for each mobile station, a DRCH start index and a HARQ bitmap.

FIG. 32 is an example of LRCH-RAB 1000 (LRCH resource assignment block). Its information fields include a number of assignments and, for each mobile station, its MAC ID, a LRCH resource allocation bitmap, a MCS, and a new packet identifier. The mobile station uses the LRCH resource allocation bitmap to locate resource assignments.

Information fields in the illustrated examples of FIGS. 24-32 are assigned a given number of bits. The size of the fields is implementation-specific.

In some embodiments, the base station uses a three-state RL acknowledgment (ACK) channel to acknowledge reception of traffic and the persistent resource assignment with RAS-HARQ on a given DCCH, for example DCCH0. A first state for use on the channel represents an ACK, a second state a NACK (negative acknowledgment), and a third state an ACK for a particular DCCH channel, such as DCCH0. More specifically, a '+1' may be used to acknowledge correct reception of traffic packet, a '0' may be used when a traffic packet is in error or no traffic packet is received, and a '−1' may be used to acknowledge correct receipt of PR-RAB, PR-RDB, or PR-HRAB in DCCH0. As such, only mobile stations which already have persistent with RAS-HARQ resources allocated on a slot of the frame or mobile stations who get new persistent with RAS-HARQ resource allocation should send the acknowledgement. A '−1' may also be used to acknowledge correct reception of other signaling sent on the DCCH. Other techniques may be used instead of signaling a '+1', '0' or '−1'.

There are several scenarios possible when both traffic and DCCH0 assignment are present in a slot. In a first scenario, a mobile station receives the correct traffic packet. This implies that the mobile station receives the correct DCCH0 since DCCH0 may be the most robust, and so the mobile station sends a '+1'. In a second scenario, the mobile station receives an incorrect traffic packet but the correct DCCH0, and so the mobile station sends a '−1'. In a third scenario, the mobile station receives an incorrect traffic packet and an incorrect DCCH0 and sends a '0'. This also applies to the situation where the mobile station does not decode traffic and the DCCH0, and therefore does not realize that there is a DCCH0 assignment or traffic destined to it.

Figure 33:
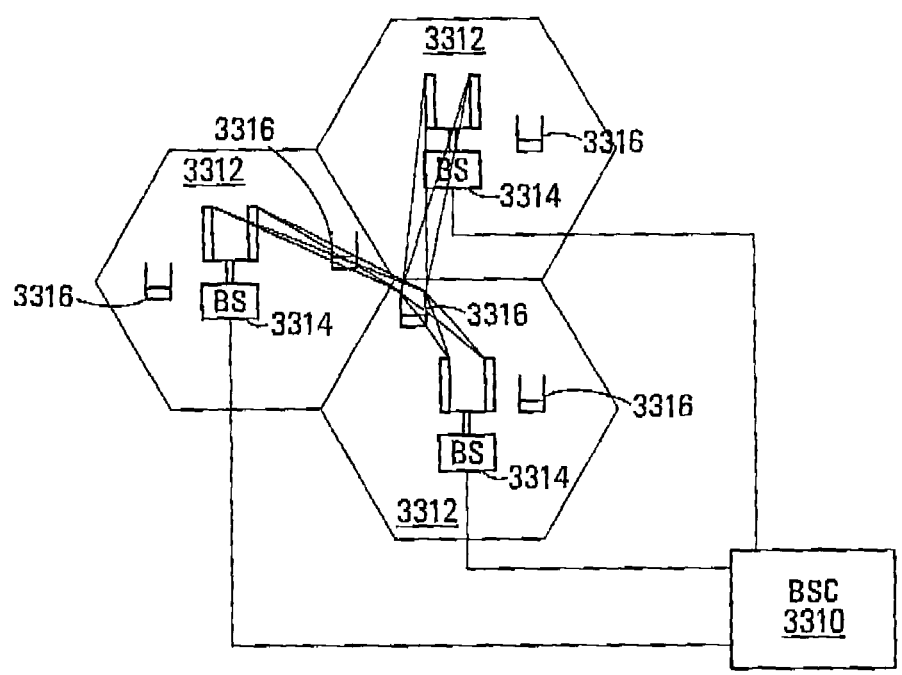
FIG. 33 depicts a cellular network.

For the purpose of providing context for embodiments of the invention for use in a communication system, FIG. 33 shows a base station controller (BSC) 3310 which controls wireless communications within multiple cells 3312, which cells are served by corresponding base stations (BS) 3314. In general, each base station 3314 facilitates communications using OFDM with mobile and/or wireless terminals 3316 (mobile station), which are within the cell 3312 associated with the corresponding base station 3314. The movement of the mobile terminals 3316 in relation to the base stations 3314 results in significant fluctuation in channel conditions. As illustrated, the base stations 3314 and mobile terminals 3316 may include multiple antennas to provide spatial diversity for communications.

Figure 34:
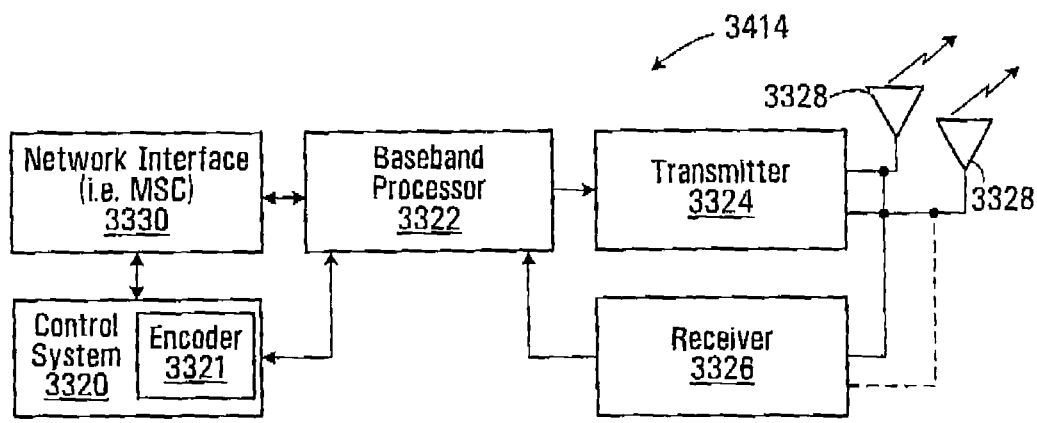
FIG. 34 depicts a high level overview of a base station configured according to an embodiment of the present invention.

A high level overview of the mobile terminals 3316 and base stations 3314 upon which aspects of the present invention are implemented is provided prior to delving into the structural and functional details of the preferred embodiments. With reference to FIG. 34, a base station 3314 is illustrated. The base station 3314 generally includes a control system 3320, an encoder 3321, a baseband processor 3322, transmitter 3324, receiver 3326, multiple antennas 3328, and a network interface 3330. Encoder 3321 is operatively connected to control system 3320 or as part of control system 3320. Encoder 3321 is operable to perform steps 1-1 to 1-4 in the flow diagram of FIG. 1. It may associate assignment schedule indices with assignment schedules itself, or it may access physical storage for a look-up table. It may select an assignment schedule, or it may receive it from another component, such as a scheduler. It may, however, be implemented in other components of base station 3314, such as baseband processor 3322. The receiver 3326 receives radio frequency signals bearing information from one or more remote transmitters provided by mobile terminals 3316 (illustrated in FIG. 33). A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 3322 processes the digitized received signal to extract the information or data bits conveyed in the received signal. This processing typically comprises demodulation, decoding, and error correction operations. As such, the baseband processor 3322 is generally implemented in one or more digital signal processors (DSPs) or application-specific integrated circuits (ASICS). The received information is then sent across a wireless network via the network interface 3330 or transmitted to another mobile terminal 3316 serviced by the base station 3314.

On the transmit side, the baseband processor 3322 receives digitized data, which may represent voice, data, or control information, from the network interface 3330 under the control of control system 3320, and encodes the data for transmission. The encoded data is output to the transmitter 3324, where it is modulated by a carrier signal having a desired transmit frequency or frequencies. A power amplifier (not shown) will amplify the modulated carrier signal to a level appropriate for transmission, and deliver the modulated carrier signal to the antennas 3328 through a matching network (not shown). Various modulation and processing techniques available to those skilled in the art are used for signal transmission between the base station and the mobile terminal.

Figure 35:
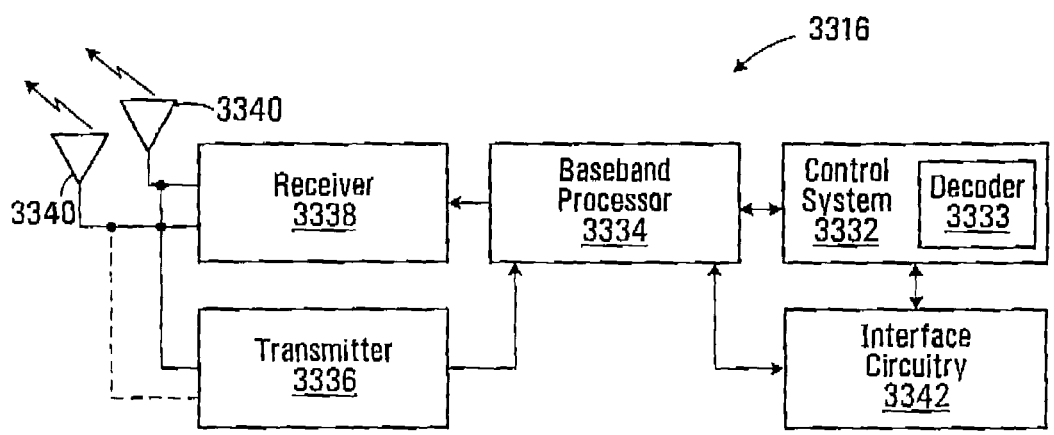
FIG. 35 depicts a high level overview of a mobile station configured according to an embodiment of the present invention.

With reference to FIG. 35, a mobile terminal 3316 configured according to one embodiment of the present invention is illustrated. Similarly to the base station 3314, the mobile terminal 3316 will include a control system 3332, a decoder 3333, a baseband processor 3334, transmitter 3336, receiver 3338, multiple antennas 3340, and mobile station interface circuitry 3342. Decoder 3333 is operatively connected to control system 3332 or as part of control system 3332. It may, however, be implemented in other components of mobile terminal 3316, such as baseband processor 3334. Decoder 3333 is operable to perform steps 15-1, 15-3, and 15-4 in the flow diagram of FIG. 15. It may associate assignment schedule indices with assignment schedules itself, or it may access physical storage for a look-up table. The receiver 3336 receives radio frequency signals bearing information from one or more base stations 3314. A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 3334 processes the digitized received signal to extract the information or data bits conveyed in the received signal. This processing typically comprises demodulation, decoding, and error correction operations. The baseband processor 3334 is generally implemented in one or more digital signal processors (DSPs) and application specific integrated circuits (ASICs).

For transmission, the baseband processor 3334 receives digitized data, which may represent voice, data, or control information, from the control system 3332, which it encodes for transmission. The encoded data is output to the transmitter 3336, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 3340 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Past Fourier Transform (IFFT) on the information to be transmitted. For demodulation, the performance of a Past Fourier Transform (PFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 3314 to the mobile terminals 3316. Each base station 3314 is equipped with "n" transmit antennas 3328, and each mobile terminal 3316 is equipped with "m" receive antennas 3340. Notably, the respective antennas can be used for reception and transmission using appropriate duplexers or switches and are so labelled only for clarity.

Figure 36:
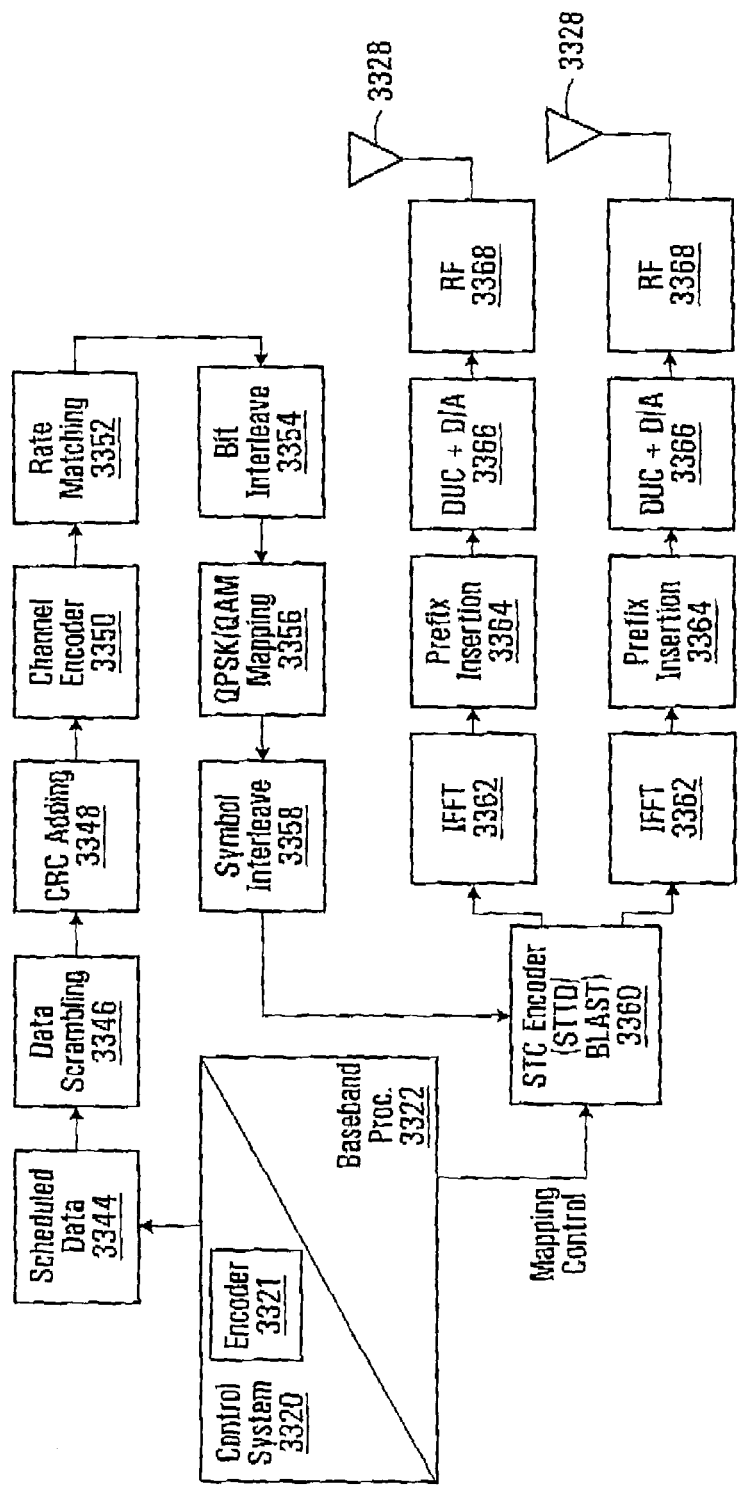
FIG. 36 depicts a logical OFDM transmission architecture.

With reference to FIG. 36, a logical OFDM transmission architecture will be described. Initially, the base station controller 3310 will send data to be transmitted to various mobile terminals 3316 to the base station 3314. The base station 3314 may use the channel quality indicators (CQIs) associated with the mobile terminals 3316 to schedule the data for transmission as well as select appropriate coding and modulation for transmitting the scheduled data. The CQIs may be directly from the mobile terminals 3316 or determined at the base station 3314 based on information provided by the mobile terminals 3316. In either case, the CQI for each mobile terminal 3316 is a function of the degree to which the channel amplitude (or response) varies across the OFDM frequency band.

Scheduled data 3344, which is a stream of bite, is scrambled in a manner reducing the peak-to-average power ratio associated with the data using data scrambling logic 3346. A cyclic redundancy check (CRC) for the scrambled data is determined and appended to the scrambled data using CRC adding logic 3348. Next, channel coding is performed using channel encoder logic 3350 to effectively add redundancy to the data to facilitate recovery and error correction at the mobile terminal 3316. Again, the channel coding for a particular mobile terminal 3316 is based on the CQI. In some implementations, the channel encoder logic 3350 uses known Turbo encoding techniques. The encoded data is then processed by rate matching logic 3352 to compensate for the data expansion associated with encoding.

Bit interleaver logic 3354 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 3358.

At this point, groups of bits have been mapped into symbols representing locations in an amplitude and phase constellation. When spatial diversity is desired, blocks of symbols are then processed by space-time block code (STC) encoder logic 3360, which modifies the symbols in a fashion making the transmitted signals more resistant to interference and more readily decoded at a mobile terminal 3316. The STC encoder logic 3360 will process the incoming symbols and provide "n" outputs corresponding to the number of transmit antennas 3328 for the base station 3314. The control system 3320 and/or baseband processor 3322 as described above with respect to FIG. 34 will provide a mapping control signal to control STC encoding. At this point, assume the symbols for the "n" outputs are representative of the data to be transmitted and capable of being recovered by the mobile terminal 3316.

For the present example, assume the base station 3314 has two antennas 3328 (n=2) and the STC encoder logic 3360 provides two output streams of symbols. Accordingly, each of the symbol streams output by the STC encoder logic 3360 is sent to a corresponding IFFT processor 3362, illustrated separately for ease of understanding. Those skilled in the art will recognize that one or more processors may be used to provide such digital signal processing, alone or in combination with other processing described herein. The IFFT processors 3362 will preferably operate on the respective symbols to provide an inverse Fourier Transform. The output of the IFFT processors 3362 provides symbols in the time domain. The time domain symbols are grouped into frames, which are associated with a prefix by prefix insertion logic 3364. Each of the resultant signals is up-converted in the digital domain to an intermediate frequency and converted to an analog signal via the corresponding digital up-conversion (DUC) and digital-to-analog (D/A) conversion circuitry 3366. The resultant (analog) signals are then simultaneously modulated at the desired RF frequency, amplified, and transmitted via the RF circuitry 3368 and antennas 3328. Notably, pilot signals known by the intended mobile terminal 3316 are scattered among the sub-carriers. The mobile terminal 3316, which is discussed in detail below, will use the pilot signals for channel estimation.

Figure 37:
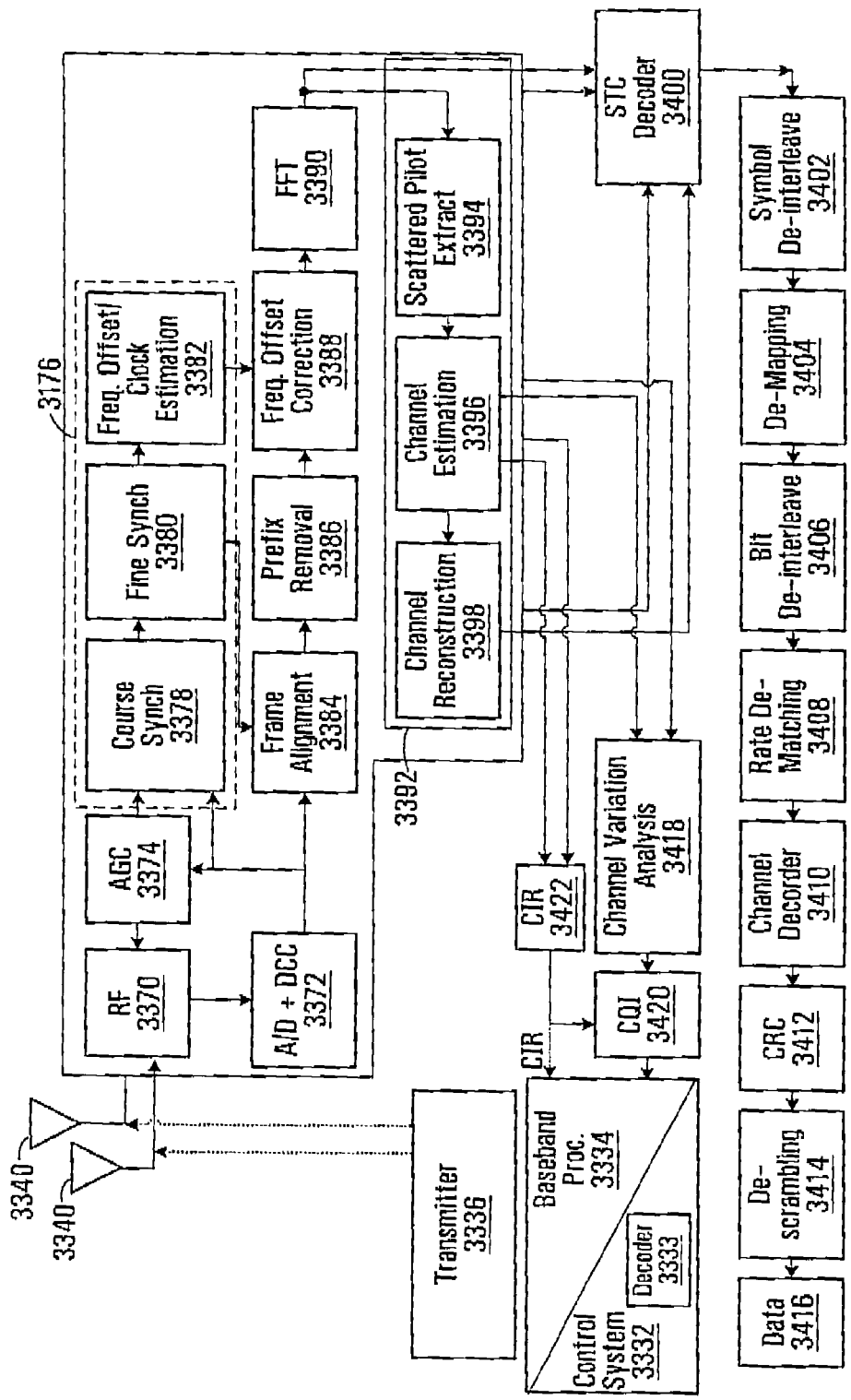
FIG. 37 depicts logical OFDM receiving architecture.

Reference is now made to FIG. 37 to illustrate reception of the transmitted signals by a mobile terminal 3316. Upon arrival of the transmitted signals at each of the antennas 3340 of the mobile terminal 3316, the respective signals are demodulated and amplified by corresponding RP circuitry 3370. For the sake of conciseness and clarity, only one of the two receive paths is described and illustrated in detail. Analog-to-digital (A/D) converter and down-conversion circuitry 3372 digitizes and downconverts the analog signal for digital processing. The resultant digitized signal may be used by automatic gain control circuitry (AGC) 3374 to control the gain of the amplifiers in the RF circuitry 3370 based on the received signal level.

Initially, the digitized signal is provided to synchronization logic 3376, which includes coarse synchronization logic 3378, which buffers several OFDM symbols and calculates an auto-Correlation between the two successive OFDM symbols. A resultant time index corresponding to the maximum of the correlation result determines a fine synchronization search window, which is used by tine synchronization logic 3380 to determine a precise framing starting position based on the headers. The output of the fine synchronization logic 3380 facilitates frame acquisition by frame alignment logic 3384. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 3386 and resultant samples are sent to frequency offset correction logic 3388, which compensates for the system frequency offset caused by the unmatched local oscillators in the transmitter and the receiver. Preferably, the synchronization logic 3376 includes frequency offset and clock estimation logic 3382, which is based on the headers to help estimate such effects on the transmitted signal and provide those estimations to the correction logic 3388 to properly process OFDM symbols.

Figure 38:
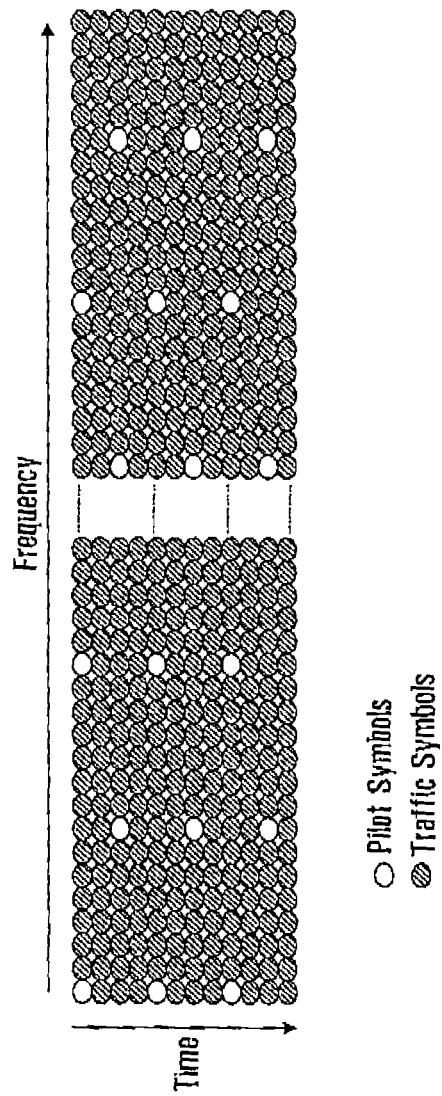
FIG. 38 depicts an exemplary scattering of pilot symbols among available sub-carriers.

At this point, the OFDM symbols in the time domain are ready for conversion to the frequency domain using FFT processing logic 3390. The results are frequency domain symbols, which are sent to processing logic 3392. The processing logic 3392 extracts the scattered pilot signal using scattered pilot extraction logic 3394, determines a channel estimate based on the extracted pilot signal using channel estimation logic 3396, and provides channel responses for all sub-carriers using channel reconstruction logic 3398. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 38, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 3400, which provides STC decoding on both received paths to recover the transmitted symbols. The channel reconstruction information provides equalization information to the STC decoder 3400 sufficient to remove the effects of the transmission channel when processing the respective frequency domain symbols.

The recovered symbols are placed back in order using symbol de-interleaver logic 3402, which corresponds to the symbol interleaver logic 3358 of the transmitter. The de-interleaved symbols are then demodulated or de-mapped to a corresponding bitstream using de-mapping logic 3404. The bits are then de-interleaved using bit de-interleaver logic 3406, which corresponds to the bit interleaver logic 3354 of the transmitter architecture. The de-interleaved bins are then processed by rate de-matching logic 3408 and presented to channel decoder logic 3410 to recover the initially scrambled data and the CRC checksum. Accordingly, CRC logic 3412 removes the CRC checksum, checks the scrambled data in traditional fashion, and provides it to the de-scrambling logic 3414 for de-scrambling using the known base station de-scrambling code to recover the originally transmitted data 3416.

In parallel to recovering the data 3416, a CQI, or at least information sufficient to create a CQI at the base station 3314, is determined and transmitted to the base station 3314. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 33 to 37 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

Embodiments have been described for a base station to assign resources. In other embodiments, other centers assign resources, such as a base station controller and a mobile switching center.

Embodiments have been described for assigning resources in the context of OFDM transmissions. In other embodiments, the methods and systems described apply to other air interfaces, such as code division multiplexing, frequency division multiplexing, single carrier and multi-carrier interfaces.

What has been described is merely illustrative of the application of the principles of the invention. Other arrangements and methods can be implemented by those skilled in the art without departing from the spirit and scope of the present invention.

We claim:

1. A method, comprising:
   determining a number of resources to be assigned to each of a plurality of mobile stations;
   selecting one of a plurality of assignment schedules based on the determined number of resources assigned to each of the plurality of mobile stations, wherein the selected assignment schedule includes assignments of resources for more than one of the plurality of mobile stations;
   determining an assignment schedule index associated with the selected assignment schedule, wherein determining the assignment schedule index associated with the selected assignment schedule comprises using an algorithm based on a table of a number of possible combination assignment schedules for various numbers of resources and various numbers of mobile stations; and
   transmitting the determined assignment schedule index.

2. The method of claim 1, wherein the resources are orthogonal frequency division multiplexing resources.

3. The method of claim 1, wherein no two assignment schedule indices are identical for the plurality of assignment schedules.

4. The method of claim 1, wherein at least two assignment schedules are associated with a same assignment schedule index.

5. The method of claim 4, further comprising transmitting:
   an indication of a number of mobile stations being assigned resources; and
   a respective mobile station identifier for each of the plurality of mobile stations.

6. The method of claim 1, wherein the at least one of the plurality of assignment schedules specifies combinations of resources assigned to each of the plurality of mobile stations without regard to an order of the assigned resources.

7. The method of claim 1, wherein the at least one of the plurality of assignment schedules specifies permutations of the number of resources assigned to each of the plurality of mobile stations.

8. The method of claim 1, further comprising transmitting a bitmap that identifies which resources are assigned and which resources are not assigned.

9. The method of claim 1, wherein the determining the number of resources to be assigned further comprises using a resource assignment granularity selected from a plurality of resource assignment granularities, the method further comprising transmitting an indicator of the resource assignment granularity.

10. The method of claim 1, wherein determining the assignment schedule index associated with the selected assignment schedule comprises using a table for looking up the assignment schedule index based on the assignment schedule.

11. The method of claim 10, wherein using a table comprises using a table consisting of a sub-set of the assignment schedule indices associated with a sub-set of the assignment schedules.

12. The method of claim 11, wherein respective assignment schedule indices are associated with each of a plurality of sub-sets of the assignment schedules, such that no two assignment schedule indices are identical for two assignment schedules.

13. The method of claim 1, wherein determining the assignment schedule index associated with the selected assignment schedule further comprises using a recursive algorithm to determine the assignment schedule index based on the assignment schedule.

14. The method of claim 1, wherein determining the assignment schedule index associated with the selected assignment schedule comprises using an algorithm to determine the assignment schedule index based on the assignment schedule, if the number of mobile stations and the number of N resources is less than a predetermined number.

15. The method of claim 1, wherein determining the assignment schedule index associated with the selected assignment schedule further comprises deriving the index using rules.

16. The method of claim 1, wherein the table has the following properties:
   $L\{M, N\}=0$ for $M>N$;
   $L\{M, N\}=1$ for $M=1$;
   $L\{M, N\}=1$ for $M=N$; and
   $L\{M, N\}=L\{N-1, M-1\}+L\{N-M, M\}$ for $1<M<N$;
   wherein L is a number of possible combination assignment schedules for M mobile stations and N resources.

17. A base station comprising:
   communication circuitry for performing wireless communication; and
   an encoder coupled to the communication circuitry, wherein the encoder is configured to:
      determine a number of resources to be assigned to each of a plurality of mobile stations,
      select one of a plurality of assignment schedules based on the determined number of resources assigned to each of the plurality of mobile stations, wherein the selected assignment schedule includes assignments of resources for more than one of the plurality of mobile stations, and
      determine an assignment schedule index associated with the selected assignment schedule, wherein determining the assignment schedule index associated with the selected assignment schedule comprises using an algorithm based on a table of a number of possible combination assignment schedules for various numbers of resources and various numbers of mobile stations; and
a transmitter for transmitting the determined assignment schedule index.

18. A method for a mobile station to be assigned resources comprising:
receiving an assignment schedule index;
determining an assignment schedule associated with the received assignment schedule index, from a plurality of possible assignment schedules, wherein the determined assignment schedule includes assignments of resources for a plurality of mobile stations, wherein determining the assignment schedule associated with the received assignment schedule index comprises using an algorithm based on a table of a number of possible combination assignment schedules for various numbers of resources and various numbers of mobile stations; and
determining a number of resources which the mobile station is assigned based on the determined assignment schedule.

19. The method of claim 18, wherein the resources are orthogonal frequency division multiplexing resources.

20. The method of claim 18, wherein no assignment schedule index is associated with multiple assignment schedules of the plurality of possible assignment schedules.

21. The method of claim 18, wherein at least two assignment schedules of the plurality of possible assignment schedules are associated with a same assignment schedule index.

22. The method of claim 21, further comprising receiving an indication of a number of mobile stations of the plurality of mobile stations and a respective mobile station identifier for each mobile station of the plurality of mobile stations.

23. The method of claim 18, wherein the determined assignment schedule comprises combinations of the number of resources assigned to each mobile station of the plurality of mobile stations without regard to an order of the assigned resources.

24. The method of claim 18, wherein the determined assignment schedule comprises permutations of the number of resources assigned to each mobile station of the plurality of mobile stations.

25. The method of claim 18, further comprising receiving a bitmap for identifying which resources are assigned and which resources are not assigned.

26. The method of claim 18, the method further comprising receiving an indicator of a resource assignment granularity selected from a plurality of resource assignment granularities.

27. The method of claim 18, wherein determining the assignment schedule associated with the received assignment schedule index comprises using a table for looking up the assignment schedule based on the received assignment schedule index.

28. The method of claim 27, wherein using a table comprises using a table consisting of a sub-set of the assignment schedule indices associated with a sub-set of the assignment schedules.

29. The method of claim 28, wherein respective assignment schedule indices are associated with each of a plurality of sub-sets of the assignment schedules, such that no two assignment schedule indices are identical for two assignment schedules.

30. The method of claim 18, wherein determining the assignment schedule associated with the received assignment schedule index further comprises using a recursive algorithm to determine the assignment schedule index based on the assignment schedule.

31. The method of claim 18, wherein determining the assignment schedule associated with the received assignment schedule index comprises using an algorithm to determine the assignment schedule based on the received assignment schedule index, if the number of mobile stations of the plurality of mobile stations and the number of N resources is less than a predetermined number.

32. The method of claim 18, wherein determining the assignment schedule associated with the received assignment schedule index further comprises deriving the assignment schedule using rules.

33. The method of claim 18, wherein the table has the following properties:
$L\{M, N\}=0$ for $M>N$;
$L\{M, N\}=1$ for $M=1$;
$L\{M, N\}=1$ for $M=N$; and
$L\{M, N\}=L\{N-1, M-1\}+L\{N-M, M\}$ for $1<M<N$;
wherein L is a number of possible combination assignment schedules for M mobile stations and N resources.

34. A mobile station comprising:
a receiver for receiving an assignment schedule index;
a decoder, coupled to the receiver, wherein the decoder is configured to:
determine an assignment schedule associated with the received assignment schedule index, from a plurality of possible assignment schedules, wherein the determined assignment schedule includes assignments of resources for a plurality of mobile stations, wherein determining the assignment schedule associated with the received assignment schedule index comprises using an algorithm based on a table of a number of possible combination assignment schedules for various numbers of resources and various numbers of mobile stations; and
determine a number of resources which the mobile station is assigned based on the determined assignment schedule.

* * * * *